US009009135B2

(12) United States Patent
Gutlapalli et al.

(10) Patent No.: US 9,009,135 B2
(45) Date of Patent: Apr. 14, 2015

(54) METHOD AND APPARATUS FOR SATISFYING A SEARCH REQUEST USING MULTIPLE SEARCH ENGINES

(75) Inventors: Hari Krishna Gutlapalli, Union City, CA (US); Ashish Joshi, San Mateo, CA (US); Hema Bharadwaj, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 266 days.

(21) Appl. No.: 12/696,528

(22) Filed: Jan. 29, 2010

(65) Prior Publication Data
US 2011/0191312 A1 Aug. 4, 2011

(51) Int. Cl.
*G06F 17/30* (2006.01)

(52) U.S. Cl.
CPC ...................................... *G06F 17/30* (2013.01)

(58) Field of Classification Search
CPC .............................................. G06F 17/30011
USPC .......... 707/705, 706, 707, 713, 718, 999.003, 707/999.006, 711, 715
See application file for complete search history.

(56) References Cited

U.S. PATENT DOCUMENTS

| | | | |
|---|---|---|---|
| 4,754,321 A | 6/1988 | Srivastava ..................... 348/652 |
| 5,692,176 A | 11/1997 | Holt et al. .............................. 1/1 |
| 5,787,428 A | 7/1998 | Hart ....................................... 1/1 |
| 6,182,142 B1 | 1/2001 | Win et al. ...................... 709/229 |
| 6,327,590 B1 | 12/2001 | Chidlovskii et al. .............. 707/5 |
| 6,421,675 B1 | 7/2002 | Ryan et al. ............................ 1/1 |
| 6,640,219 B2 | 10/2003 | Fernandes et al. ................ 707/3 |
| 6,640,249 B1 | 10/2003 | Bowman-Amuah .......... 709/228 |
| 6,704,726 B1 * | 3/2004 | Amouroux ............................ 1/1 |
| 7,020,658 B1 | 3/2006 | Hill ....................................... 1/1 |
| 7,039,625 B2 | 5/2006 | Kim et al. ..................... 707/706 |
| 7,133,863 B2 * | 11/2006 | Teng et al. .................... 707/708 |
| 7,143,085 B2 | 11/2006 | Brown et al. ......................... 1/1 |
| 7,254,571 B2 | 8/2007 | Brown et al. ......................... 1/1 |
| 7,487,072 B2 * | 2/2009 | Semple et al. ..................... 703/3 |
| 7,644,065 B2 * | 1/2010 | Wu et al. ................ 707/999.003 |
| 7,725,447 B2 | 5/2010 | Subramaniam et al. ...... 707/705 |
| 7,953,984 B1 | 5/2011 | Chung et al. .................. 713/188 |
| 8,375,362 B1 | 2/2013 | Brette et al. ................... 717/121 |
| 8,874,545 B2 * | 10/2014 | Gutlapalli et al. ............ 707/707 |
| 2002/0057297 A1 | 5/2002 | Grimes et al. ................ 345/810 |
| 2002/0087526 A1 | 7/2002 | Rao .................................. 707/3 |
| 2002/0107842 A1 * | 8/2002 | Biebesheimer et al. .......... 707/3 |
| 2002/0116402 A1 | 8/2002 | Luke ............................. 707/200 |
| 2003/0050959 A1 * | 3/2003 | Faybishenko et al. ........ 709/202 |
| 2003/0126136 A1 | 7/2003 | Omoigui ......................... 707/10 |
| 2003/0193994 A1 | 10/2003 | Stickler ......................... 375/150 |
| 2003/0236859 A1 | 12/2003 | Vaschillo et al. ............. 709/218 |
| 2004/0015485 A1 | 1/2004 | Salerno et al. ................... 707/3 |

(Continued)

*Primary Examiner* — Marc Filipczyk
(74) *Attorney, Agent, or Firm* — Campbell Stephenson LLP

(57) ABSTRACT

A server receives a search request in a third format. The third format is a search request format. A first search query in a first format is generated. The first format is a first search query format. A second search query is generated in a second format. The second format is compatible with a format used by a second search engine. The second format is a second search query format. The search request is in the third format. The first format and the second format are different from one another. First result data comprising a plurality of first result data items, and second result data comprising a plurality of second result data items are received. A search result is generated. The generating the search result includes consolidating the plurality of the first result data items and the plurality of the second result data items.

34 Claims, 29 Drawing Sheets

(56) References Cited

U.S. PATENT DOCUMENTS

| | | | |
|---|---|---|---|
| 2004/0030682 A1 | 2/2004 | Porter et al. | 707/3 |
| 2004/0205079 A1 | 10/2004 | Azzam | 707/100 |
| 2004/0215643 A1 | 10/2004 | Brechner et al. | 707/100 |
| 2005/0086204 A1 | 4/2005 | Coiera et al. | 7/3 |
| 2005/0165754 A1 | 7/2005 | Valliappan et al. | 707/3 |
| 2005/0165766 A1 | 7/2005 | Szabo | 707/3 |
| 2006/0085215 A1 | 4/2006 | Weigt et al. | 705/1 |
| 2006/0248050 A1 | 11/2006 | Brooks et al. | 1/1 |
| 2006/0253476 A1 | 11/2006 | Roth et al. | 707/100 |
| 2007/0058596 A1 | 3/2007 | Frid-Nielsen et al. | 370/338 |
| 2007/0060114 A1 | 3/2007 | Ramer et al. | 455/418 |
| 2007/0081550 A1 | 4/2007 | Moore | 370/462 |
| 2007/0130131 A1 | 6/2007 | Porter et al. | 707/3 |
| 2007/0208697 A1 | 9/2007 | Subramaniam et al. | 707/3 |
| 2007/0244863 A1 | 10/2007 | Adams et al. | 707/3 |
| 2007/0244867 A1 | 10/2007 | Malandain et al. | 707/3 |
| 2007/0260620 A1 | 11/2007 | Smolen et al. | 707/100 |
| 2007/0299704 A1 | 12/2007 | Wildhagen et al. | 705/7 |
| 2008/0027971 A1 | 1/2008 | Statchuk | 707/102 |
| 2008/0147457 A1 | 6/2008 | Rapp | 705/7 |
| 2008/0275844 A1 | 11/2008 | Buzsaki et al. | 707/3 |
| 2008/0281901 A1* | 11/2008 | Lusher et al. | 709/202 |
| 2009/0024599 A1* | 1/2009 | Tata | 707/4 |
| 2009/0234813 A1* | 9/2009 | Gutlapalli et al. | 707/3 |
| 2011/0093478 A1 | 4/2011 | Starks et al. | 707/754 |
| 2012/0069131 A1 | 3/2012 | Abelow | 348/14.01 |

\* cited by examiner

METHOD AND APPARATUS FOR SATISFYING A SEARCH REQUEST USING MULTIPLE SEARCH ENGINES

CROSS REFERENCE TO RELATED APPLICATIONS

This application is related to the following U.S. patent applications filed concurrently herewith, all of which are incorporated by reference herein in their entirety and for all purposes:

U.S. patent application Ser. No. 12/696,551, filed on Jan. 29, 2010, entitled "Predictive Categorization," and naming Hari Krishna Gutlapalli, Ashish Joshi and Hema Bharadwaj as inventors;

U.S. patent application Ser. No. 12/696,526, filed on Jan. 29, 2010, entitled "Subsequent Search Results," and naming Hari Krishna Gutlapalli, Hema Bharadwaj and Suhas Rohit Mehta as inventors; and U.S. patent application Ser. No. 12/696,605, filed on Jan. 29, 2010, entitled "Collapsible Search Results," and naming Hari Krishna Gutlapalli, Hema Bharadwaj and Suhas Rohit Mehta as inventors.

BACKGROUND

The profusion of electronic records in the modern enterprise has led companies to own or use a profusion of multiple database systems for electronic record storage. The result of this database profusion is that information related to a single topic or a single inquiry is spread across multiple databases and is difficult to concentrate in a single location for integrated use. These multiple database systems are frequently incompatible. As a result, a search for records related to a single topic may involve multiple searches in multiple database systems, and each database system may be tied to a different search engine with different rules for search execution. Each search engine may require a different query format. Significant incompatibilities between different database formats and different search query formats exist. Existing tools fail to provide a user interface to generate a single search query and have that search query applied by multiple search engines to multiple databases. Existing tools create an environment in which significant lost time costs are inflicted on the enterprise by search queries that must be applied to multiple databases in order to deliver a comprehensive picture of the information environment.

As an example, a hypothetical situation might exist in which the annual compensation review of a sales employee required data to be retrieved from both a "sales performance" database and a "benefits" database. A frequent problem in dealing with this hypothetical situation is that the "benefits" database requires a different query format than the "sales performance" database. When dealing with information spread across multiple databases attached to multiple search engines, multiple search requests must be entered. The entry of multiple requests costs the enterprise creates cost in terms of the dollar value of the time invested in the creation and execution of multiple search requests. The entry of multiple requests costs the enterprise creates cost in terms of the lost opportunities relating to searches that failed to find the correct information or failed to find the correct information in a timely manner.

SUMMARY

A server receives a search request in a third format. The third format is a search request format. A first search query in a first format is generated. The first format is compatible with a format used by a first search engine. The first format is a first search query format. The first search query is generated from the search request. A second search query is generated in a second format. The second format is compatible with a format used by a second search engine. The second format is a second search query format. The second search query is generated from the search request. The search request is in the third format. The first format and the second format are different from one another. First result data comprising a plurality of first result data items, and second result data comprising a plurality of second result data items are received. A search result is generated. The generating the search result includes consolidating the plurality of the first result data items and the plurality of the second result data items.

BRIEF DESCRIPTION OF THE DRAWINGS

The present invention may be better understood, and its numerous objects, features and advantages made apparent to those skilled in the art by referencing the accompanying drawings.

The use of the same reference symbols in different drawings indicates similar or identical items.

DETAILED DESCRIPTION

A search services module receives a single search query from a user interface and applies the query to multiple search engines. Application to multiple search engines is accomplished by receiving a generic search request from the user interface and translating the generic search request into a set of engine-specific queries. Each of the engine-specific queries is sent to a corresponding engine. The search engines send results back to the search services module. The search services module receives the results and compiles them into a single search result.

Figure 1:
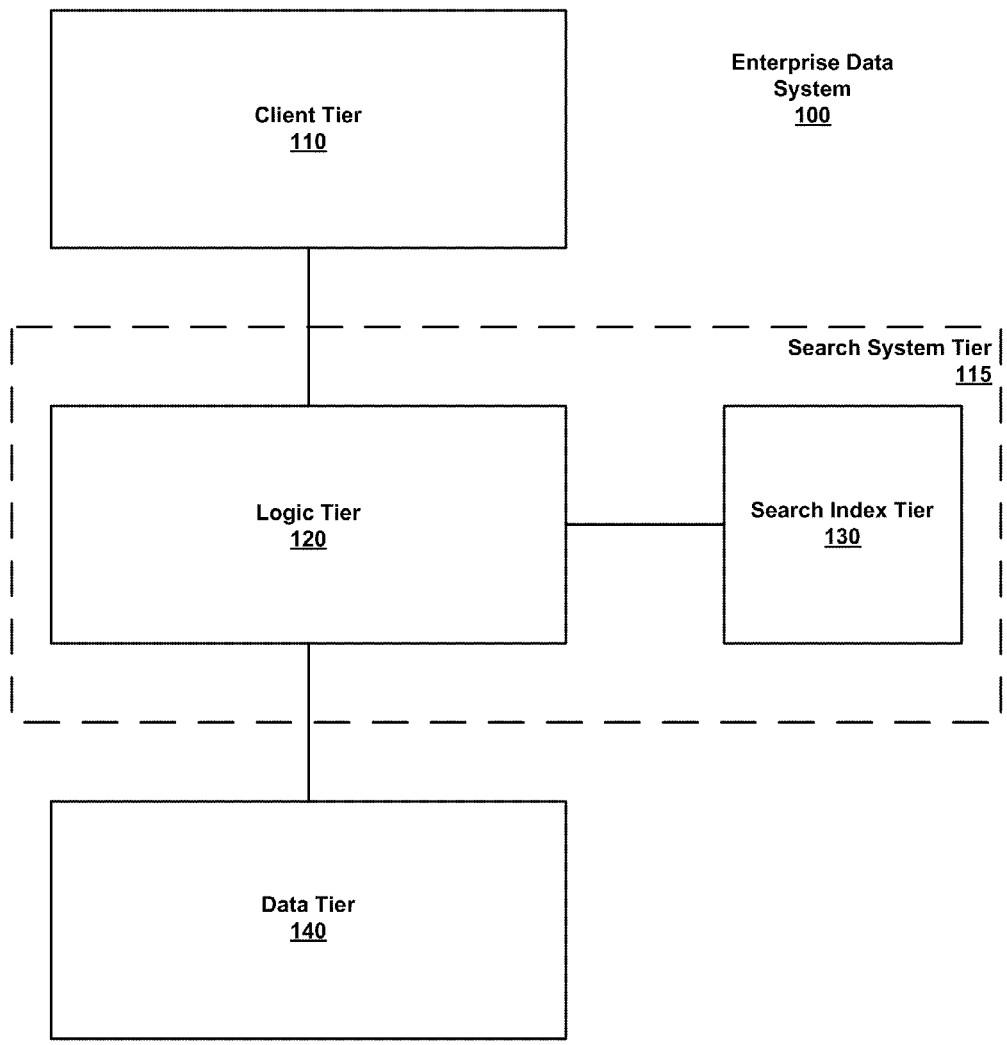
FIG. 1 is a block diagram illustrating an enterprise data system according to an embodiment of the present invention.

FIG. 1 is a block diagram of an enterprise data system 100, in which a system embodying or employing the present invention can be implemented. Enterprise data system 100 includes a client tier 110, a search system tier 115 (which, in turn, includes a logic tier 120 and a search index tier 130), and a data tier 140. Client tier 110 accesses data tier 140 via search system tier 115 (and so, logic tier 120). Client tier 110 is able to search the data residing in data tier 140 via capabilities provided by search index tier 130 to logic tier 120. Client tier 110 includes components, detailed subsequently with respect to FIG. 10B, for receiving at a generic search adapter in logic tier 120 a single search request from a user interface and translating that single search request into multiple search queries in formats compatible with multiple search engines through the use of an engine translation table. Logic tier 120 receives multiple result data items in response to the multiple search queries and generates a single consolidated search result. In one embodiment, logic tier 120 further generates a user profile to generate an order of display priority, according to which client tier 110 displays results.

Figure 2:
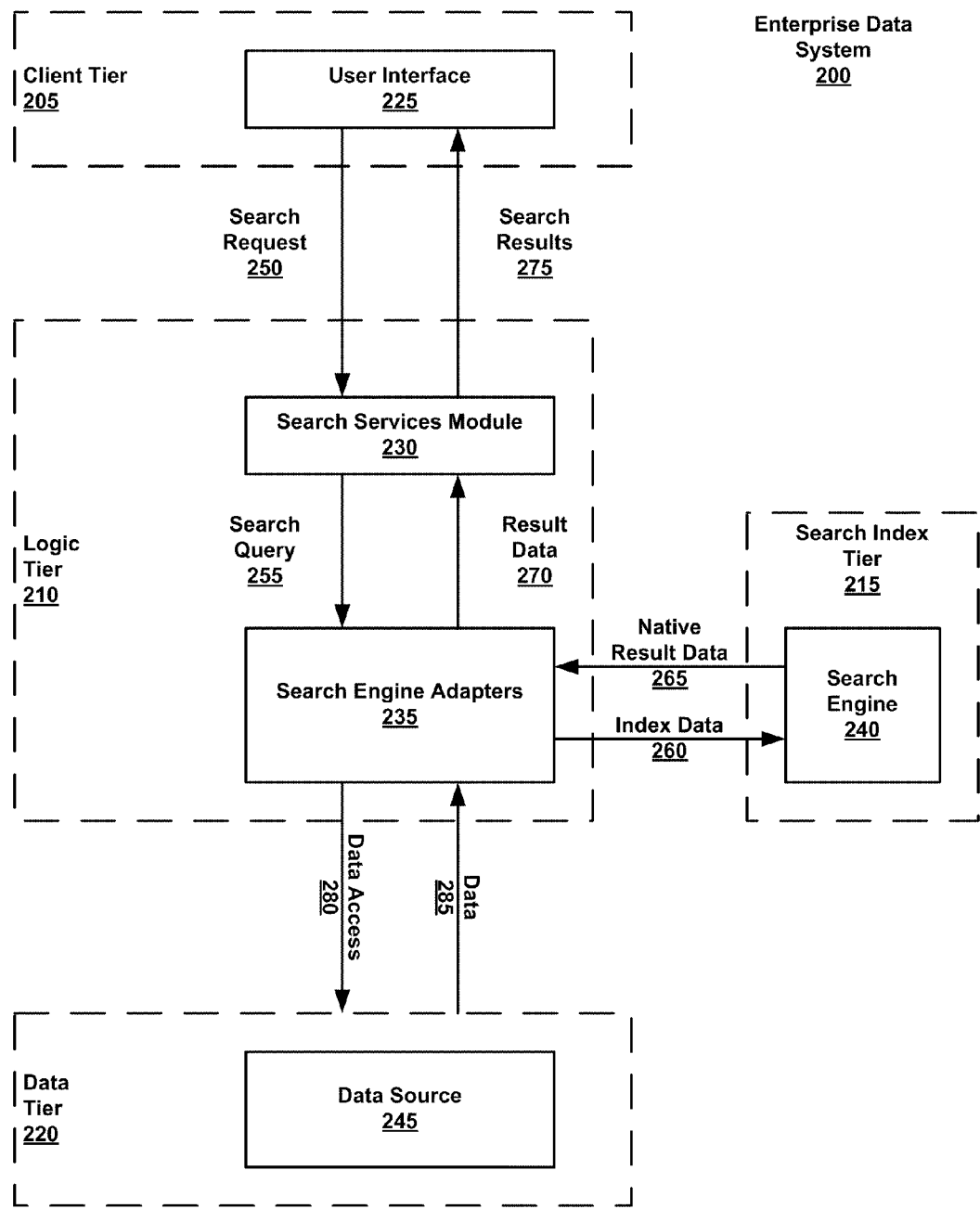
FIG. 2 is a block diagram illustrating an enterprise data system according to an embodiment of the present invention.

FIG. 2 illustrates in greater detail examples of components of an enterprise data system such as enterprise data system 100 of FIG. 1. An enterprise data system 200 is thus depicted in FIG. 2 as including a client tier (depicted in FIG. 2 as a client tier 205), a logic tier (depicted in FIG. 2 as a logic tier 210), a search index tier (depicted in FIG. 2 as a search index tier 215) and a data tier (depicted in FIG. 2 as a data tier 220). Client tier 205 is depicted in FIG. 2 as including a user interface 225, which represents the interface for communicating with logic tier 210 (and so search index tier 215 and data tier 220), to a user of enterprise data system 200.

In turn, logic tier 210 is depicted in FIG. 2 as including search services module 230 and search engine adapters 235. Search engine adapters 235 provide for communications between search services module 230 and elements of search index tier 215 and data tier 220. In so doing, search engine adapters 235 provide a generic interface to search services module 230, while allowing search services module 230 to be agnostic to the specifics of components within search index tier 215 and data tier 220. User interface 225 includes components, detailed subsequently with respect to FIG. 10B, for capturing a search request 250 and transmitting that request in a generic format to search services module 230. Search service module 230 generates multiple search queries, each for a specific search engine 240 and communicates each search query 255 to one of search engine adapters 235. Search engine adapters send result data 270 to search services module 230. In one embodiment, search service module 230 uses a user profile to generate an order of display priority, according to which user interface 225 displays results. Search results 275 are sent to user interface 225 by search service module 230.

Search services 230 can be implemented as objects, for example. Such objects need not be tied to specific objects, but rather, can operate or act upon objects to achieve a particular goal. Such services can be reused, and can be used by external systems to communicate with applications. Such objects can be configured to work with a set of properties, which can be set through the use of administrative tools. Search services 230 can also store information regarding searches performed (e.g., during a given session), using caching, for example. By supporting such storage, search services module 230 is able to support persistent searches.

Search engine adapters 235 can be implemented as driver dynamic link libraries (DLLs), for example. Using the present disclosure, such driver DLLs can be implemented by third parties (using what is referred to herein as a "Third Party Interface"). The interface for a particular search can then be implemented internally or by a third party vendor. These DLLS support the plug-and-play mechanism for search engines in embodiments of the present invention. Using this approach, a third-party search engine is then able to plug into the application by implementing the third party interface.

Search index tier 215 includes a search engine 240, which allows for the searching of data residing in data tier 220. This data is represented in FIG. 2 as a data source 245 within data tier 220.

User interface 225 communicates a search request 250 to search services module 230 in logic tier 210. Search request 250 can be in a standard format, and so, for example, can be communicated as a property set. Search services 230 then communicates search request 250 to search engine adapters 235 as a search query 255. For example, search query 255 can be communicated using an extensible markup language (XML). Search engine adapters 235 then communicate search query 255 to search engine 240 as index data 260. Index data 260 will typically be in a native database format.

Search engine 240 performs the request search, and returns its results as native result data 265. As with index data 260, native result data 265 will typically be in a native database format. Search engine adapters 235 communicate these results to search services module 230, as result data 270. Search services 230 then order the data based on an order of display priority and communicate these results from logic tier 210 to user interface 225 within client tier 205, as search results 275. As before, communications between user interface 225 and search services module 230 can be, and preferably are, in a standard format, such as property sets. User interface 225 receives search results 275, and then presents these results to the user.

Should the user desire further information on one or more of the results in search results 275, the user once again employs user interface 225 to communicate refined search requests information (search request 250) to search services module 230. Search services module 230 records this request for more information to a user profile. Search services module 230 once again sends search query 255 (appropriately modified to reflect the additional information desired by the user) to search engine adapters 235. Search engine adapters 235 then perform a data access 280 in order to access the data in data source 245. Data source 245 then returns the requisite data as data 285. Data access 280 and data access 285 are preferably communicated between search engine adapters 235 and data source 245 using a standard format such as XML. Additionally, a data abstraction layer can be implemented between search engine adapters 235 and data source 245, either as a separate module, or (from at least the perspective of search engine adapters 235) as part of data tier 220. In one embodiment, this data abstraction layer is implemented as one or more virtual business components.

Regarding the signals described herein, those skilled in the art will recognize that a signal may be directly transmitted from a first block to a second block, or a signal may be modified (e.g., amplified, attenuated, delayed, latched, buffered, inverted, filtered or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The foregoing described an embodiment wherein the different components are contained within different other components (e.g., the various elements/components of a computer system). It is to be understood that such depicted architectures are merely examples, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", "communicatively coupled" or "operably coupled", to each other to achieve the desired functionality.

Figure 3:
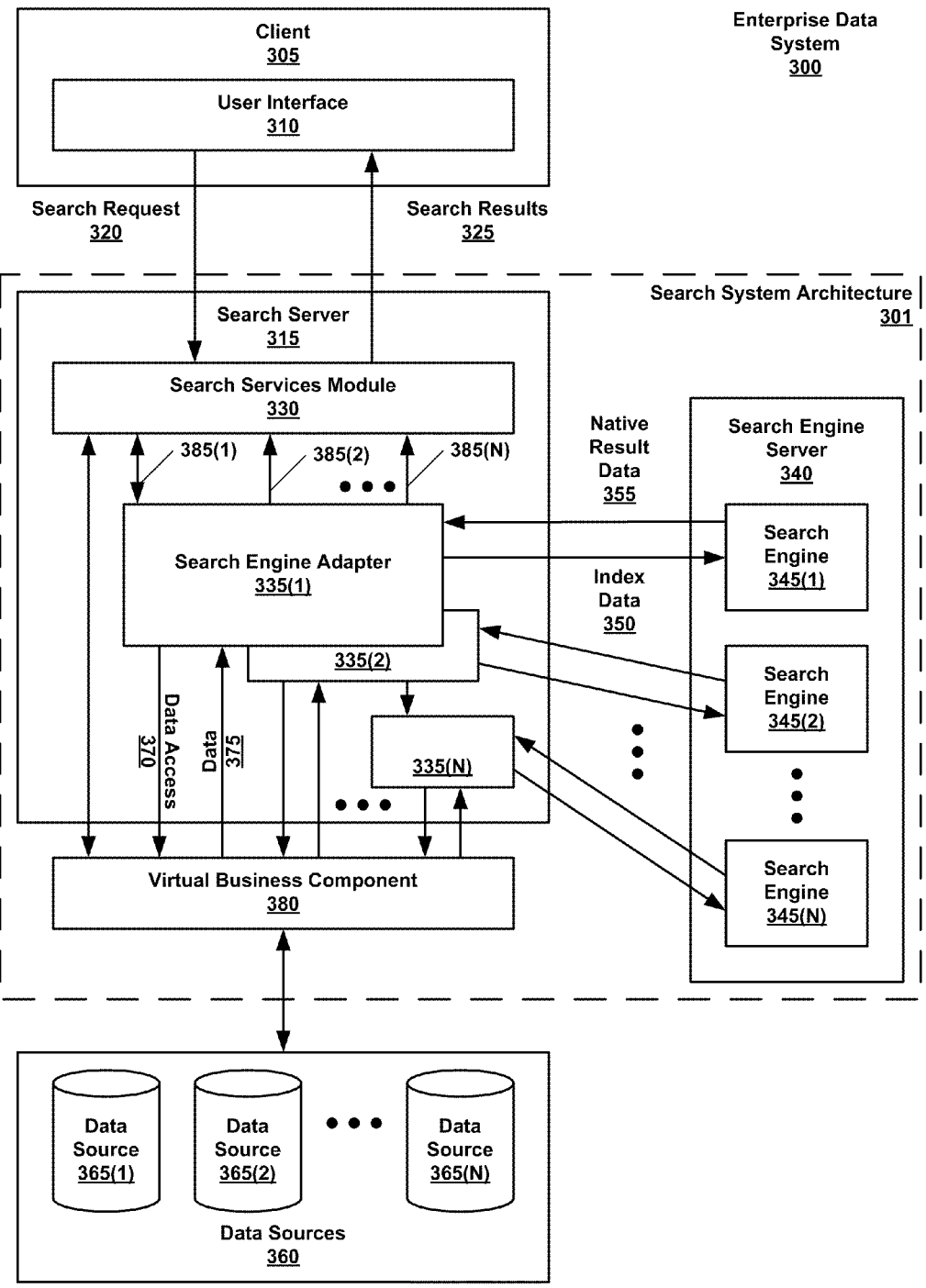
FIG. 3 is a block diagram illustrating an enterprise data system according to an embodiment of the present invention.

FIG. 3 is a block diagram of an enterprise data system 300 depicting an example of an implementation of an enterprise data system, such as those depicted in FIGS. 1 and 2. Enterprise data system 300 includes a search system architecture 301, which includes a number of elements, as described subsequently. As before, a client 305 (within a client tier) supports a user interface 310. User interface 310 communicates with a search server 315 of search system architecture 301 by sending a search request 320 in a generic search request format and receiving search results 325, to/from search services module 330, respectively, which resides on search server 315. User interface 310 further reports user responses to search results to search services module 330, which records the responses to results in a user profile. Search services 330 communicate with a number of search engine adapters (depicted in FIG. 3 as search engine adapters 335(1)-(N)) in a manner such as that depicted in FIG. 2 (as search query 255 and result data 270) by opening and closing communication threads, which are described below.

In the aforementioned manner, for example, search engine adapter 335(1) is able to communicate with a search engine residing on a search engine server 340 of search system architecture 301. A number of search engines of the present invention are depicted in FIG. 3 as search engines 345(1)-(N). Thus, search engine adapter 335(1) communicates with search engine 345(1) by sending index data 350 and subsequently receiving native result data 355. While search engine adapters 335(1)-(N) and search engines 345(1)-(N) are depicted in FIG. 3 as having a one-to-one relationship, a single search engine adapter can be implemented to support more than one search engine, and access to a given search engine can be implemented so as to allow search services module 330 to use two or more of search engine adapters 335(1)-(N). Thus, the number of each need not be equal, or even comparable.

Moreover, it will be noted that the variable identifier "N" is used in several instances in FIG. 3 to more simply designate the final element (e.g., search engine adapters 335(1)-(N) and search engines 345(1)-(N)) of a series of related or similar elements (e.g., search engine adapters and search engines). The repeated use of such variable identifiers is not meant to imply a correlation between the sizes of such series of elements, although such correlation may exist. The use of such variable identifiers does not require that each series of elements has the same number of elements as another series delimited by the same variable identifier. Rather, in each instance of use, the variable identified by "N" may hold the same or a different value than other instances of the same variable identifier.

If further information with respect to the data thus identified is desired, the user can "drill down" (delve further into the data identified). Thus, in the manner discussed with regard to access by search engine adapters 235 to data source 245 in FIG. 2, search engine adapters 335(1)-(N) access data sources 360 (depicted in FIG. 3 as including data sources 365(1)-(N)) to get whatever additional information is desired and available. To do so, one or more of search engine adapters 335(1)- (N) sends a request for further information on a given search or search results (depicted in FIG. 3 as a data access 370). In response, the one or more of search engine adapters 335(1)- (N) receives the requested additional information (depicted in FIG. 3 as data 375). As is depicted in FIG. 3, search engine adapters 335(1)-(N) access data sources 360 via a virtual business component 380 of search system architecture 301.

User interface 310 includes components, detailed subsequently with respect to FIG. 10B, for capturing a user response to a search result 325 and transmitting that user response to search services module 330. The response captured includes data allowing a subsequent user of the data to differentiate between responses to search results on the basis of sourcing, (e.g., which of the various search engines 345 (1)-(N) provided search results receiving responses). Search service module 330 generates a user profile, which includes data allowing a subsequent user of the data to differentiate between subsequent search results on the basis of sourcing, (e.g., which of the various search engines 345(1)-(N) provided the subsequent search results), from the user response received in response to search results 325 sent by search service module 330. Search service module 330 then uses the user profile to generate an order of display priority, according to which user interface 310 displays results of a second search, which prioritizes search results on the basis of sourcing, (e.g., which of the various search engines 345(1)-(N) sent the search results in question). Additionally, in one embodiment, engine priority is based upon the aggregate popularity of individual results from particular sources with the general population of users.

In one embodiment, a communications thread is a closed-loop session of interactions between search services module 330, a search engine adapter 335, and a search engine 345, including query/result pairs 385, index data 350, and native result data 355. In one embodiment, each of query/result pairs 385 is typically transmitted in a format different from the format used for search request 320 and search results 325. Similarly, a format used by search services module 335 to communicate a query/result pair 385(1) with search engine adapter 335(1) is typically different from a format used by search services module 335 to communicate a query/result pair 385(2) with search engine adapter 335(2) or a format used by search services module 335 to communicate a query/ result pair 385(N) with search engine adapter 335(N). Likewise, search engine 345(1) uses a different naming schema than search engine 345(2) or search engine 345(N). For instance, a first such naming schema might refer to a field for storing a username as a "user_name" field. A second such naming schema might refer to a field for storing a username as a "username" field. Because of the difference in field names between the first naming schema and the second naming schema, the first naming schema and the second naming schema might be incompatible.

Virtual business component 380 can represent external data as a business component. This allows the user to represent external data as a business component within an application. Virtual business component 380 also allows search services (e.g., search services module 330) to transfer data directly to and receive data directly from user interface 310 on client 305, as shown in FIG. 3.

Virtual business component 380, in the manner discussed with regard to the data abstraction layer of a virtual business component, provides a data abstraction layer that allows search engine adapters 335(1)-(N) to access data sources 365(1)-(N) of data sources 360 in an abstract manner. This allows search engine adapters 335(1)-(N) to access the various data sources within data sources 360 (e.g., various databases having various formats, file systems having various formats, flat-file databases, electronic mail in various formats, resources on the Internet, resources within an enterprise's internal network and many other such data sources). Thus, search server 315 is able to provide access to searchable data located within a heterogeneous set of searchable objects provided by a variety of vendors and accessed through different search engines that require communication in different search query formats and to differentially rank data and results received from such a heterogeneous set of searchable objects provided by a variety of vendors on the basis of the searchable object, search engine or vendor from which the data is received. Data sources 365 thus correspond to the searchable objects that can include databases, file systems, portals, electronic mails, and other electronically-accessible data sources. As can also be seen in FIG. 3, virtual business component 380 also provides an interface that is accessible by search services module 330.

The architecture illustrated in FIG. 3 can therefore provide a variety of types of searches. Examples of such searches include keyword searches, full text searches, single item/ multiple item searches, Boolean expression searches, and synonym searches, among other such searches. Using the current invention, each of these types of searches can be supported through a generic search request, in spite of different search engines using different naming schema and accepting searches in different search query formats. In addition, the search system in FIG. 3 can provide for sorting results of searches by source and refining searches through various functionalities provided by search server 315. Provision of the various functionalities can also result in different user interface screens being provided to a user throughout a session. Alternatively, use of different user interface screens can be minimized or eliminated, if a strictly uniform user interface is desired.

Search services module 330 is configured, in part, through the use of a search index. By referencing the search index, the search services can provide the user interface with information identified by values provided for searching using the searchable fields available to the user. A search index can be built by providing a mapping between the searchable fields in the search index and the related fields found within the searchable objects of interest. Embodiments of the present invention provide such a mapping through the use of a modifiable field mapping file. The field mapping file provides information necessary to make a linkage between fields of the search index and fields of a variety of searchable objects. Further, a user can be provided with the ability to modify the field mappings file. If such a modification is performed, the searchable index can be modified at runtime to provide access to or deny access to fields affected by such a modification of the field mappings file.

Figure 4A:
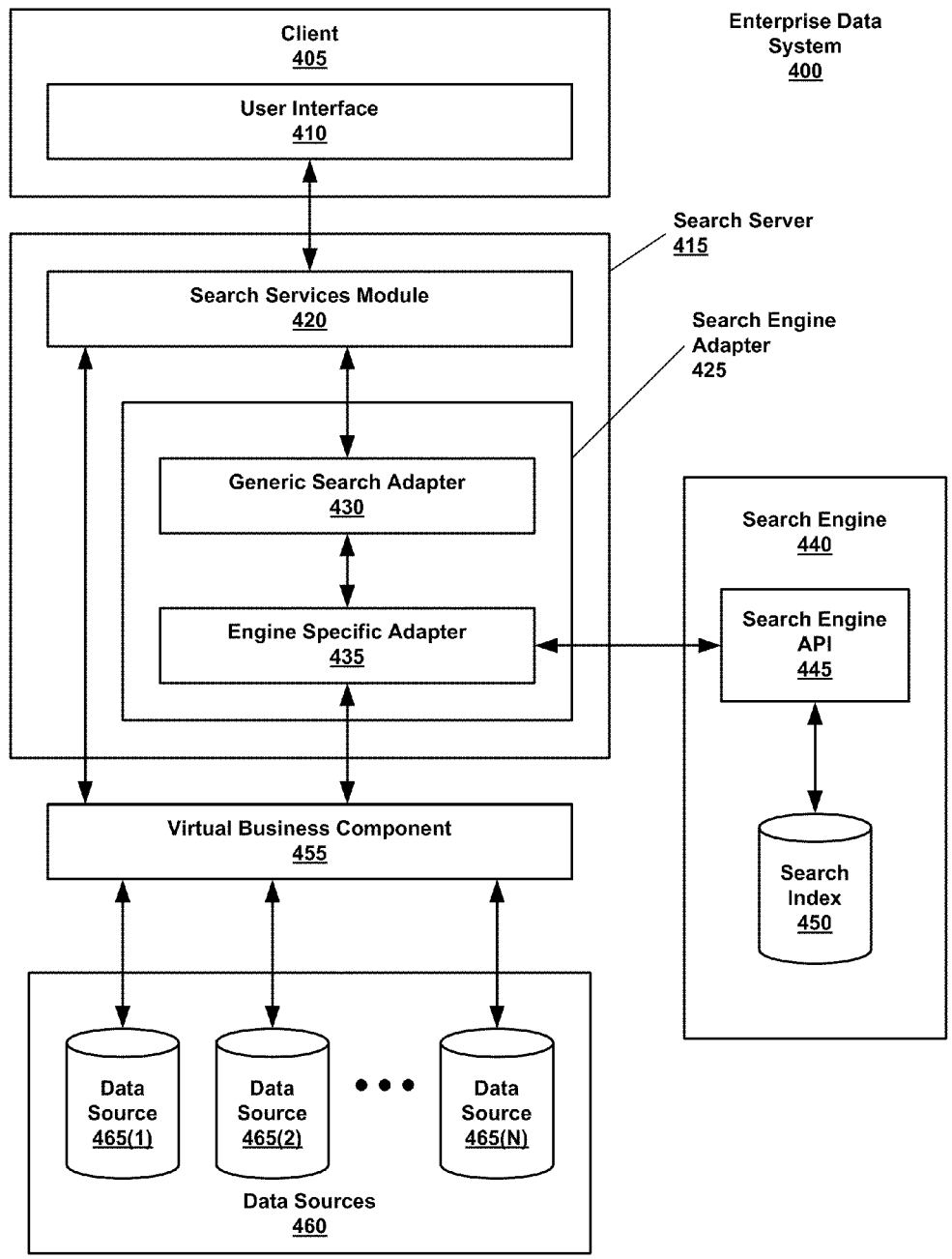
FIG. 4A is a block diagram illustrating an enterprise data system according to an embodiment of the present invention.

FIG. 4A is a block diagram of an enterprise data system 400 that depicts various features of a search engine adapter in greater detail. As before, a client 405 provides a user interface 410 to a user of enterprise data system 400. User interface 410 interfaces with a search server 415 on which a search services module 420 and a search engine adapter 425 by sending a search request in a generic format. As depicted in FIG. 4A, search engine adapter 425 includes a generic search adapter 430 and an engine specific adapter 435. Generic search adapter 430 provides a standardized generic interface for search engine adapter 425 (e.g., using XML), and is accessible by search services module 420. Generic search adapter 430 communicates with engine specific adapter 435 in accessing a search engine 440 by sending search queries in an engine-specific format, using a format such as XML or property sets. Engine specific adapter 435 is implemented so as to use a search engine application programming interface (API) 445 to access search engine 440.

As will be appreciated in light of the present disclosure (and particularly, search engine adapters 335(1)-(N)), rather than a number of search engine adapters such as search engine adapter 425, a number of search engines (e.g., search engines 345(1)-(N), of which search engine 440 is an example) can also be implemented by providing a number of search engine adapters (of which search engine adapter 425 is an example), although such a configuration is not shown in FIG. 4A for the sake of simplicity. It will be further appreciated that the implementation of multiple search engine adapters does not mandate the implementation of multiple generic search adapters—a single generic search adapter can be configured to support multiple search engine adapters by translating a generic search request into engine-specific search queries. Further, a combination of generic search adapters can be implemented to provide some combination of 1:1 or 1:N support for multiple search engine adapters. Again, such alternatives, though contemplated by the present disclosure, are not shown in FIG. 4A for the sake of simplicity. Search engine 440 presents search engine API 445 to search engine adapter 425 such that engine specific adapter 435 is able to access a search index 450 of search engine 440 in order to provide search services module 420 with the information requested by the user via user interface 410.

In the manner noted earlier with regard to FIG. 3, search engine adapter 425, via engine specific adapter 435 and a virtual business component 455, is provided access to data sources 460. Data sources 460, as depicted in FIG. 4A, include a number of data sources (depicted in FIG. 4A as data sources 465(1)-(N)). Although depicted and referred to in the singular, virtual business component (VBC) 455 can be implemented as a set of VBCs, if needed (as will be discussed subsequently), though including a number of elements. Virtual business component 455 allows search services module 420 and search engine adapter 425 (via engine specific adapter 435) to access data sources 465(1)-(N) either a generic or an engine-specific manner, respectively. As such, virtual business component 455 will, in fact, typically include a number of business objects (not shown in FIG. 4A, for the sake of simplicity), and can, for example, include a business object corresponding to each of data sources 465(1)-(N), thus further supporting the ability to differentially rank data and results received from such a heterogeneous set of searchable objects provided by a variety of vendors on the basis of the searchable object, search engine or vendor from which the data is received. As will be apparent to one having skilling the art after reading the present disclosure, in alternative embodiments, both the engine specific adapter and generic adapter can be hosted on a middleware server and need not be essentially grouped with other modules (e.g., business services, virtual business components, user interface, etc.), thus enabling multiple adapters independent of other modules.

Figure 4B:
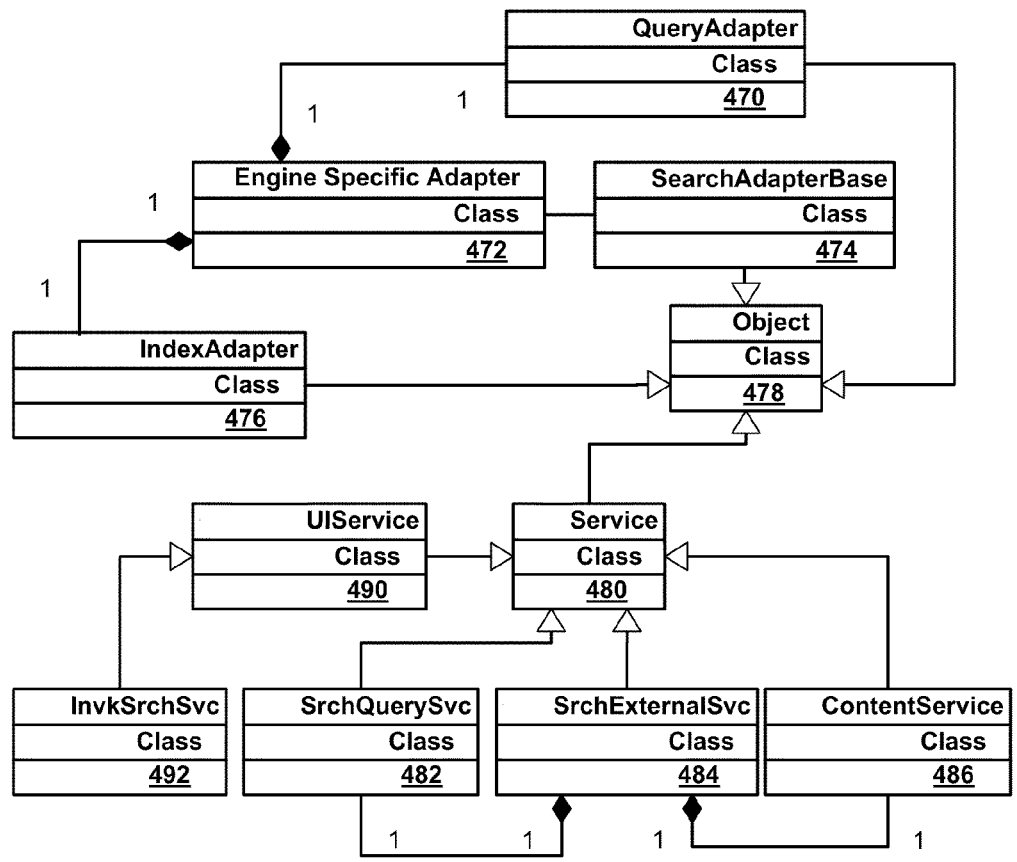
FIG. 4B is a low-level class diagram for an enterprise data system according to an embodiment of the present invention.

FIG. 4B is a low-level class diagram for an enterprise data system such as those depicted in FIGS. 2, 3 and 4A. As will be appreciated, a class diagram is a type of static structure diagram that describes the structure of a system by showing the system's classes, their attributes, and the relationships between the classes. An example of modeling such relationships is the use of the Unified Modeling Language (UML), which is used in FIG. 4B. The low-level class diagram of FIG. 4B includes:

A QueryAdapter Class 470
An EngineSpecificAdapter Class 472
A SearchAdapterBase Class 474
An IndexAdapter Class 476
An Object Class 478
A Service Class 480
A SearchQueryService Class 482
A SearchExternalService Class 484
A ContentService Class 486
A UIService Class 490
An InvokeSearchService Class 492

In the low-level class diagram of FIG. 4B, QueryAdapter Class 470 is composed of EngineSpecificAdapter Class 472, and these classes have a 1:1 relationship. QueryAdapter Class 470 has a relationship with an aggregation of object classes (represented in FIG. 4B by ObjectClass 478). In turn, EngineSpecificAdapter Class 472 has an association with SearchAdapterBase Class 474. SearchAdapterBase Class 474 has a relationship with an aggregation of object classes (represented in FIG. 4B by ObjectClass 478). IndexAdapter Class 476 is composed of EngineSpecificAdapter Class 472, in a 1:1 relationship, and has a relationship with an aggregation of object classes (represented in FIG. 4B by ObjectClass 478).

Service Class 480 also has a relationship with an aggregation of object classes (represented in FIG. 4B by ObjectClass 478). InvokeSearchService Class 492 has a relationship with UIService Class 490, which, in turn, has a relationship with Service Class 480 (and so ObjectClass 478). SearchQueryService Class 482, SearchExternalService Class 484 and ContentService Class 486 each also have a relationship with Service Class 480 (and so ObjectClass 478). SearchQueryService Class 482, SearchExternalService Class 484 and ContentService Class 486 also have relationships among themselves. Both SearchQueryService Class 482 and ContentService Class 486 are composed of SearchExternalService Class 484, and these classes have a 1:1 relationship.

In terms of UML, the foregoing thus implies that all other classes in FIG. 4B inherit the basic characteristics of objects from ObjectClass 478. Similarly, QueryAdapter Class 470 is a type of EngineSpecificAdapter Class 472 (and ObjectClass 478). In turn, EngineSpecificAdapter Class 472 is a type of SearchAdapterBase Class 474. IndexAdapter Class 476 is a type of EngineSpecificAdapter Class 472 (and ObjectClass 478). Service Class 480 is also a type of ObjectClass 478. In turn, UIService Class 490, as well as SearchQueryService Class 482, SearchExternalService Class 484 and ContentService Class 486, is each a type of Service Class 480. InvokeSearchService Class 492 is a type of UIService Class 490. SearchQueryService Class 482 and ContentService Class 486 are each a type of SearchExternalService Class 484.

Using the low-level classes of FIG. 4B, search services according to embodiments of the present invention can be made independent of the underlying adapter such search services might use. Among other advantages, this independence allows search engine adapters to be swappable through translation of generic requests to engine-specific queries.

Figure 5:
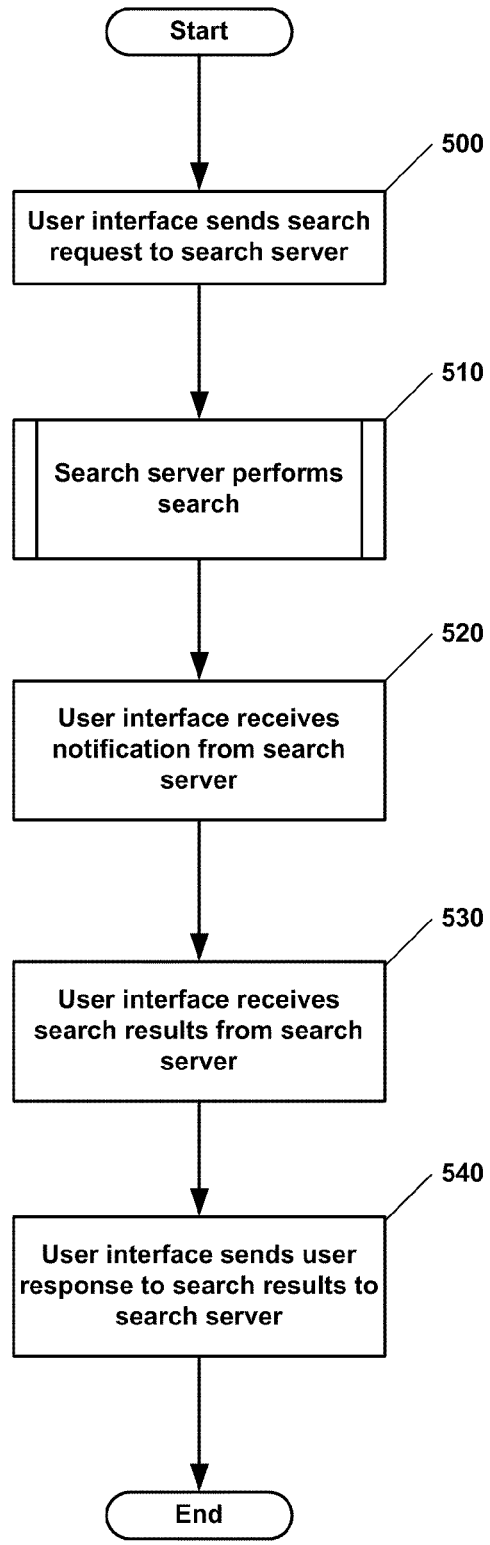
FIG. 5 is a flow diagram illustrating the operations performed in processing a search request according to an embodiment of the present invention.

FIG. 5 is a flow diagram illustrating a process of the present invention that can be performed by enterprise data systems such as those depicted in FIGS. 2, 3 and 4A. For example, the process of FIG. 5 can be implemented by enterprise data system 200.

In such a system, the process of the present invention begins with a user interacting with a user interface. The user interface 225 sends a search request to a search server in a first format, and more particularly, to a search services module (step 500). The search frame of the user interface passes the search text and category (or categories) to a search execution virtual business component. Virtual business components are used (rather than regular business components) because the data, in terms of search results, come from an external data source (namely, search indices). The virtual business component passes the search to the search services of a search server.

Next, the search server performs the requested search by passing the search request to a search engine in as a search query in an engine-specific format, as depicted in greater detail in FIG. 6 (step 510). The search server, having performed the search, returns search results to the user interface (step 520). The user interface, in turn, receives the search results from the search server, and presents these results to the user (step 530). The user interface then records and sends to the search server a user response to the search results (step 540).

As noted, FIG. 5 depicts a flow diagram illustrating a process according to one embodiment of the present invention. It is appreciated that operations discussed herein may consist of directly entered commands by a computer system user or by steps executed by application specific hardware modules, but the preferred embodiment includes steps executed by software modules, or by operations performed by hardware modules. The functionality of steps referred to herein may correspond to the functionality of modules or portions of modules.

The operations referred to herein may be modules or portions of modules (e.g., software, firmware or hardware modules). For example, although the described embodiment can include software modules and/or manually entered user commands, the various example modules can be implemented as application-specific hardware modules. If implemented as software modules, embodiments of the present invention can include script, batch or other executable files, or combinations and/or portions of such files. Such software modules may include a computer program or subroutines thereof encoded on computer-readable media.

Additionally, those skilled in the art will recognize that the boundaries between modules are merely illustrative and alternative embodiments may merge modules or impose an alternative decomposition of functionality of modules. For example, the modules discussed herein may be decomposed into submodules to be executed as multiple computer processes, and, optionally, on multiple computers. Moreover, alternative embodiments may combine multiple instances of a particular module or submodule. Furthermore, those skilled in the art will recognize that the operations described in example embodiment are for illustration only. Operations may be combined or the functionality of the operations may be distributed in additional operations in accordance with the invention.

Alternatively, such actions may be embodied in the structure of circuitry that implements such functionality, such as the micro-code of a complex instruction set computer (CISC), firmware programmed into programmable or erasable/programmable devices, the configuration of a field-programmable gate array (FPGA), the design of a gate array or full-custom application-specific integrated circuit (ASIC), or the like.

Each of the blocks of the flow diagram may be executed by a module (e.g., a software module) or a portion of a module or a computer system user using, for example, a computer system such as the computer system described subsequently herein. Thus, the methods described herein, the operations thereof and modules therefore may be executed on a computer system configured to execute the operations of the method and/or may be executed from computer-readable storage media. The method may be embodied in a machine-readable and/or computer-readable storage medium for configuring a computer system to execute the method. Thus, software modules of embodiments of the present invention may be stored within and/or transmitted to a computer system memory to configure the computer system to perform the functions of the module.

Such a computer system normally processes information according to a program (a list of internally stored instructions such as a particular application program and/or an operating system) and produces resultant output information via I/O devices. A computer process typically includes an executing program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

The software modules described herein may be received by such a computer system, for example, from computer-readable storage media. The computer-readable storage media may be permanently, removably or remotely coupled to the computer system. The computer-readable storage media may non-exclusively include, for example, any number of the following: magnetic storage media including disk and tape storage media; optical storage media such as compact disk media (e.g., CD-ROM, CD-R, etc.) and digital video disk storage media; nonvolatile memory storage memory including semiconductor-based memory units such as FLASH memory, EEPROM, EPROM, ROM or application specific integrated circuits; volatile storage media including registers, buffers or caches, main memory, RAM, and the like. In a UNIX-based embodiment, such software modules may be embodied in a file which may be a device, a terminal, a local or remote file, a socket, a network connection, or other expedient of communication or state change. Other new and various types of computer-readable media may be used to store and/or transmit the software modules discussed herein.

Figure 6A:
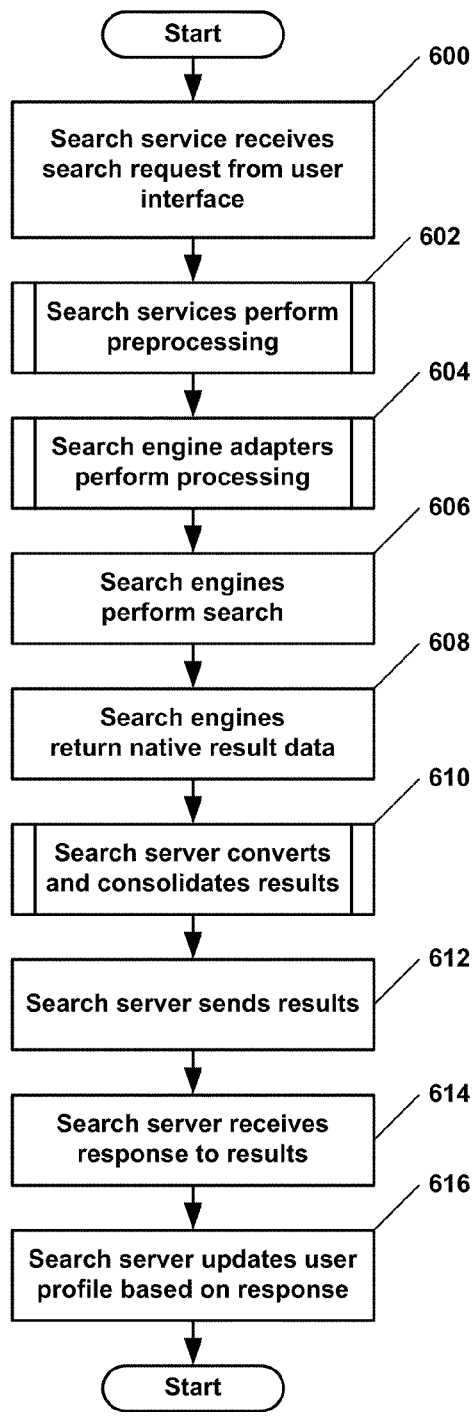
FIG. 6A is a flow diagram illustrating the operations performed in processing a search request according to an embodiment of the present invention.

FIG. 6A is a flow diagram illustrating an example of operations that a search server (e.g., search server 315 or search server 415) can perform in executing the search operations discussed with regard to FIG. 5. Such a search process begins with the search service receiving a search request in a first format from the user interface (step 600). Next, a search service on the search server performs search service preprocessing (step 602). In one embodiment, pre-processing includes filtering the search request received in step 600 on the basis of a user profile, for instance by adding terms to the search request or selecting particular resources. The process of search service preprocessing is described in further detail with regard to FIG. 7. In some embodiments of the current invention, pre-processing includes translating a search request in the previously-mentioned first format into a search query in an engine-specific format.

Once the search service preprocessing has been performed, the search services module sends the preprocessed search request to a search engine adapter in the form of a search query (step 620). As noted earlier, the search request can be communicated in the form of one or more property sets, while the search query can be communicated in an engine-specific format embodied as XML.

One example of the conversion a property set to an XML string is now presented:

```
// This method converts a property set to an XML string.
ErrCode CSSExternalBusSvc :: ToXML (CCFPropertySetInput,
CCFPropertySetOutput)
{
    // declare local property sets
    ........................
    ....................
    // Setup example property set structure
        paramArgs.SetType (SStext ("query"));
        paramArgs.SetValue (SStext(""));
        paramArgs.SetProperty (SStext ("xmlns"), SStext
("http://schemas.XYZ.com/xxx.xxx"));
    // set up structure for protocol and port
        ........................
        ....................
    //build the root XML node
        headerArgs.SetType (SStext ("xxxxxx"));
        headerArgs.SetValue (SStext (""));
        headerArgs.SetProperty (SStext ("xmlns"),
            SStext ("http:// schemas.XYZ.com/xxx.xxx "));
    //consolidate the structure. Order in which property set
    // is appended determines the hierarchy of the XML.
        headerArgs.AppendChild (paramArgs);
        headerArgs.AppendChild (protocolArgs);
        headerArgs.AppendChild (portArgs);
    // Build and add SOAP msg header,
    // if will be called as webservices.
    // Construct XML string (only an example)
        soapHeaderArgs.SetType (SStext ("SOAP-ENV:Header"));
        soapHeaderArgs.SetValue (SStext (""));
        soapHeaderArgs.AppendChild (headerArgs);
        soapMsgArgs.AppendChild (soapHeaderArgs);
        soapMsgArgs.AppendChild (*soapBodyArgs);
    // convert xml hierarchy in the property set to xml document
        DOCHILD (m_pModel, GetService
        (EAI_SVC_NAME_XMLHIER_CNV,
pXMLHierConvSvc));
        CCF_ASSERT (pXMLHierConvSvc);
    // build the communication protocol and conversion standards
        xmlHier.AppendChild(soapMsgArgs);
        transportInHier.AppendChild(xmlHier);
        transportInHier.SetProperty(SStext ("EscapeNames"),
    SStext ("FALSE"));
        transportInHier.SetProperty
(EAI_METHARG_XML_CHAR_ENCODING, SStext ("UTF-8"));
    transportInHier.SetProperty
(EAI_METHARG_XMLCNV_ADD_CRLF_PARAM,
SStext ("false"));
        transportInHier.SetProperty
(EAI_METHARG_GEN_PROC_INSTR_PARAM,
SStext ("false"));
    // Output XML is in transportInDoc,
    // as one name and value pair.
        DOCHILD (pXMLHierConvSvc, InvokeMethod
(EAI_METHOD_HIER_TO_DOC, transportInHier,
        transportInDoc));
```

Once the search engine adapter receives the search query, the search engine adapter performs search engine adapter processing on the search query (step 604). The process of search engine adapter processing is described in further detail with regard to FIG. 8.

The search request, having been preprocessed by the search services and processed by the search engine adapter, is then sent to a search engine as index data. Using this information, the search engine is able to perform the requested search (step 606). The search engine then returns the results thus identified as native result data to the requesting search engine adapter (step 608). Native result data is, in one embodiment, returned in an engine-specific format. Via processing by the search engine adapter and the search services, the search server consolidates and converts the native result data from multiple engines into search results that are then provided by the search services to the user interface (step 610). The processes performed in converting the native result data into search results for consumption by the user interface (via the search services module and the search engine adapter) are discussed in further detail with regard to FIGS. 9A-9C. In one embodiment, the processes performed in converting the native result data into search results for consumption by the user interface includes conversion of result data from an engine specific format or formats into a generic format usable by the user interface. In one embodiment, the processes performed in converting the native result data into search results for consumption by the user interface further include ordering search results based on a user profile. The search server then sends the converted search results to the user interface (step 612). The search server receives and records user responses to the results (step 614). The search server then updates a user profile based on the results (step 616).

Figure 6B:
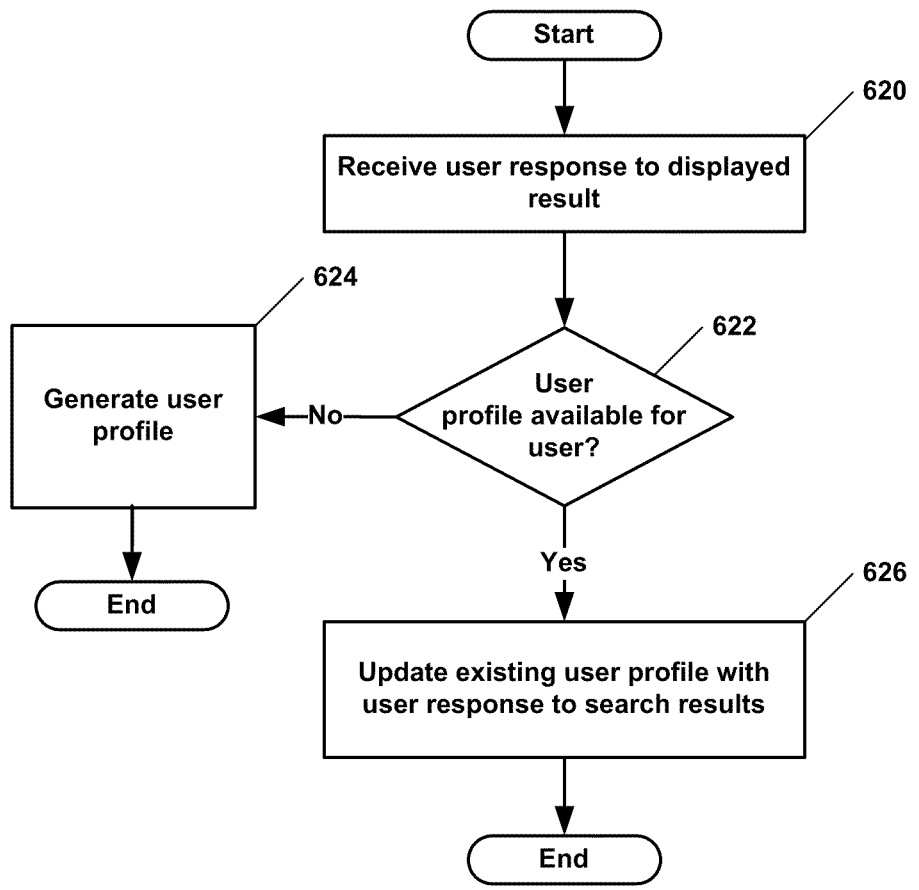
FIG. 6B is a flow diagram illustrating the operations performed in processing a user response to search results according to an embodiment of the present invention.

FIG. 6B is a flow diagram illustrating the operations performed in processing a user response to search results according to an embodiment of the present invention. A user response to a displayed result (step 620) is received, for example, at a search services module. A determination is made as to whether a user profile (or, in an alternative embodiment, any other data structure used for recording user preferences) exists for the user from whom a response to search results has been received (step 622). If a user profile does not exist for the user from whom a response to search results has been received, a user profile is created with the received response to search results (step 624). If a user profile exists for the user from whom a response to search results has been received, the existing user profile is updated with the received response to search results (step 626).

Figure 6C:
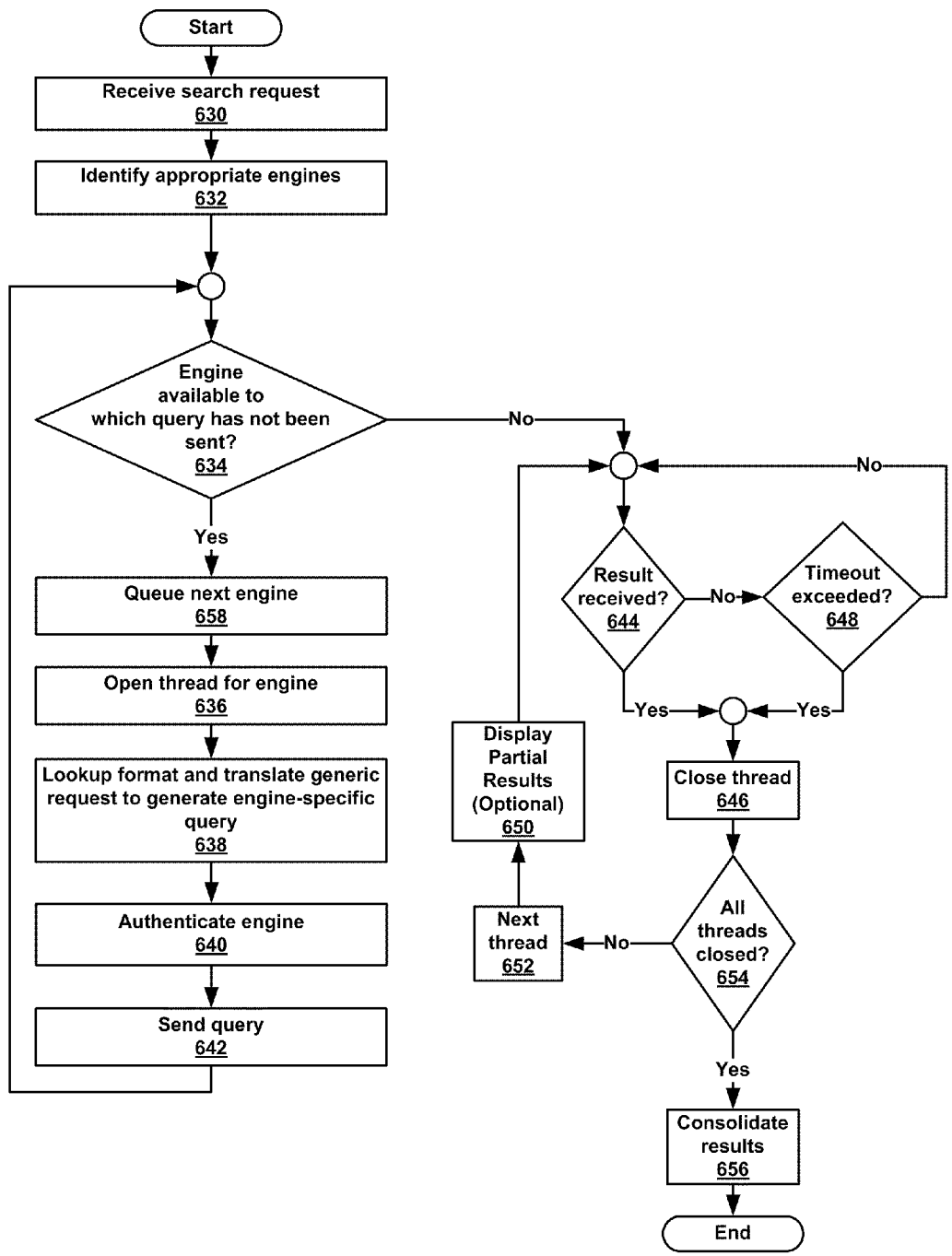
FIG. 6C is a flow diagram illustrating the operations performed in processing a search request according to an embodiment of the present invention.

FIG. 6C is a flow diagram illustrating the operations performed in processing a search request according to an embodiment of the present invention. A search request is received at a search services module (step 630). Appropriate engines for executing the search are identified (step 632) as discussed in further detail in FIG. 6D. In one embodiment, search engines are identified on the basis of results stored in a user profile (e.g., engines are selected based on the engines that provided search results to which a user has previously responded). In another embodiment, search engines are identified on the basis of selections indicated through a search request through a user interface (e.g., a user selects engines through click boxes in a user interface). A third embodiment combines both user selection and selection based on user preferences. As will be appreciated from the present disclosure, these and other search technologies can be combined in a number of ways, and will vary from embodiment to embodiment.

From among the appropriate engines, a determination is made as to whether there are any remaining engines to which a query has not been sent (step 634). If there remain appropriate engines to which a query has not been sent, a next engine is queued (step 658). A communication thread is opened for the newly-queued engine (step 636). In one embodiment, a communications thread is a closed-loop session of communications. In this regard, opening such a thread refers to creating a data structure for tracking the communications with a particular engine and depositing in that data structure an indication that communication has been initiated. Next, a format specific to the queued engine is looked up in an engine translation table and the generic request received in step 630 is translated into an engine specific query (step 638). The queued engine is authenticated through the sending and receiving of handshake and security credential information (step 640). The engine-specific query is then sent to a search engine (step 642).

Returning to step 634, if it is determined that there remain no appropriate engines to which a query has not been sent, a determination is made as to whether any result has been received in an open thread (step 644). If no result has been received, a determination is made as to whether a timeout (i.e., a fixed time in which to receive a response) has been exceeded for any open thread (step 648). If either a timeout has been exceeded or a response has been received, the thread for which the timeout has been exceeded or the response has been received is closed (step 646). A determination is then made as to whether all threads associated with the current search request are closed (step 654). If all threads are closed, results are processed and consolidated for display (step 656). Alternatively, if all threads are not closed, a next unclosed thread is queued for monitoring (step 652). Optionally, partial results are presented for display (step 650).

Figure 6D:
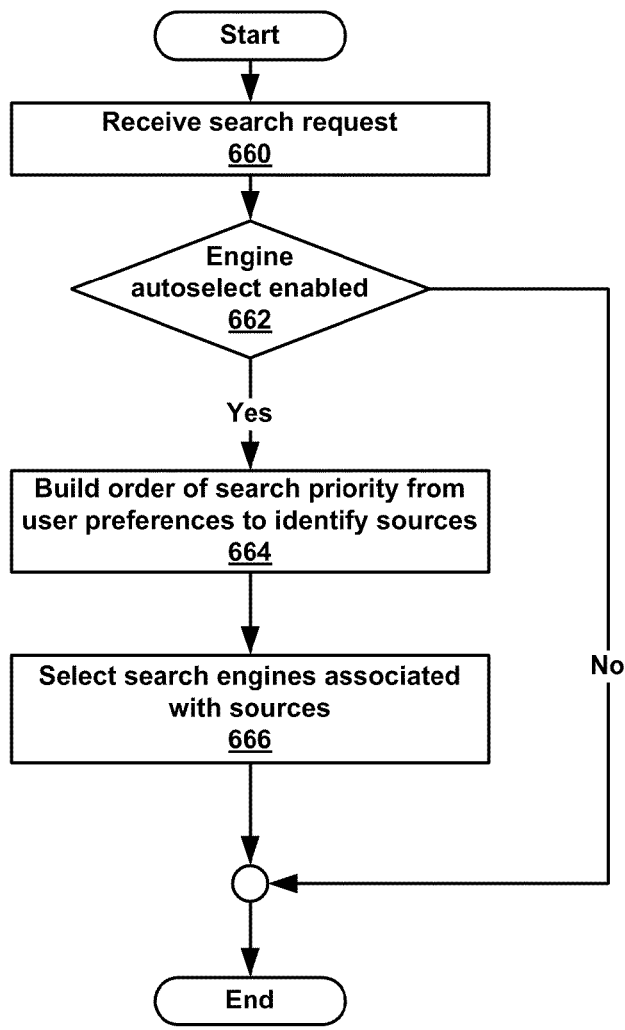
FIG. 6D is a flow diagram illustrating the operations performed in processing a search request according to an embodiment of the present invention.

FIG. 6D is a flow diagram illustrating the operations performed in processing a search request according to an embodiment of the present invention. A search request is received (step 660). A determination is made as to whether engine autoselect is enabled for the user making the search request (step 662). If autoselect is not enabled, an order of search priority is built based on user preferences for particular sources as expressed in response to previous search results (step 664). Search engines are then selected on the basis of which engines are most effective for the preferred sources (step 666).

Figure 7:
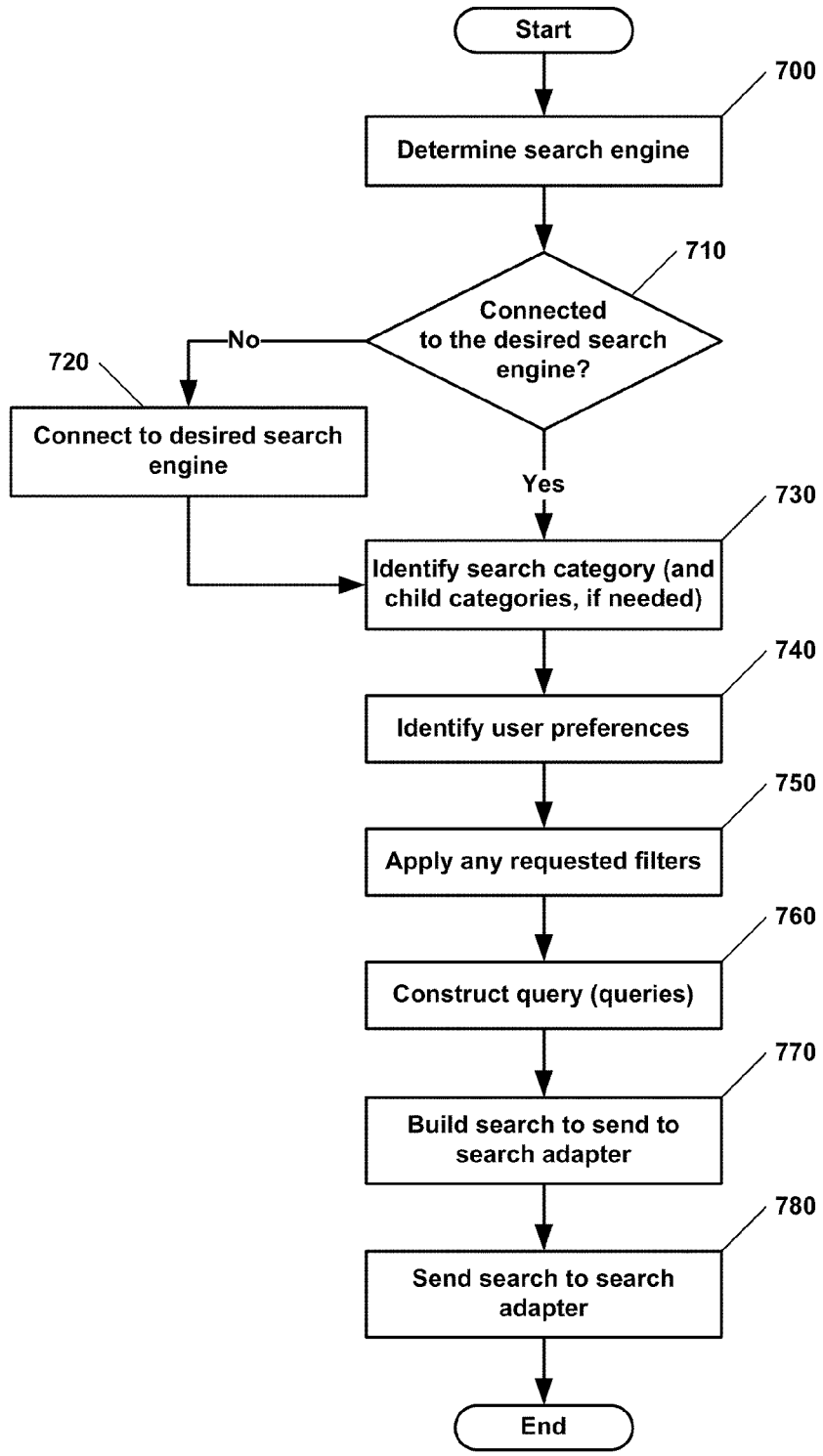
FIG. 7 is a flow diagram illustrating the operations performed in processing a search request according to an embodiment of the present invention.

FIG. 7 is a flow diagram illustrating in greater detail the operations performed by search services in performing search services preprocessing. In embodiments employing the process depicted in FIG. 7, the process of search services preprocessing begins with a determination by the search service as to which search engine(s) will be used in performing the given search (step 700). In one embodiment, search engines can be used on the basis of having been requested by a user. Alternatively, search engines can be selected on the basis of indications in a user profile, such as those indicating that a user has responded positively to results provided by a particular engine or to data sources handled by the search engine. The search services then determine whether the search server (via one or more search engine adapters) is connected to the desired search engine(s) (step 710). If the search server is not connected to the desired search engine(s), the search services can make calls to various administrative services, that in turn create a connection to the search server to the desired search engine(s) (step 720).

Once connected to the desired search engine(s), the search services identify the desired search categories, and if needed, attendant child categories (step 730). The search services then identify any user preferences communicated to the search server in the given search request or in the user profile (step 740). The search services then apply any filters requested by the user or indicated as being useful on the basis of preferences contained in the user profile for particular results associated with particular filters (step 750). The search services, using this information and other information in the search request and the user profile, then constructs the query or queries necessary to affect the search requested by the user (step 760). With the query (or queries) thus constructed, the search services then build one or more searches to send to the search adapters using the standardized generic format employed in communications between the search services and the search engine adapters (step 770). The search (or searches) thus constructed are then sent to the requisite search adapter(s) (step 780).

The following is an example of a template of a search request created using XML:

```
<search>
    <engine name="SearchEngine">
        <action name="query" value="Basic Search">
            <category>xxxxxxxx</category>
            <constraints>
                <Last Name>xxx</Last Name>
                <First Name>xxxx</First Name>
                <Account>xxxxx</Account>
                <Email>xxxxx</Email>
                .......
                ......
            </constraints>
            <Preferences>
                50
                <Summary>True</Summary>
                .......
                ........
            </Preferences>
        </action>
        <version>1.0</version>
    </engine>
</search>
```

Figure 8:
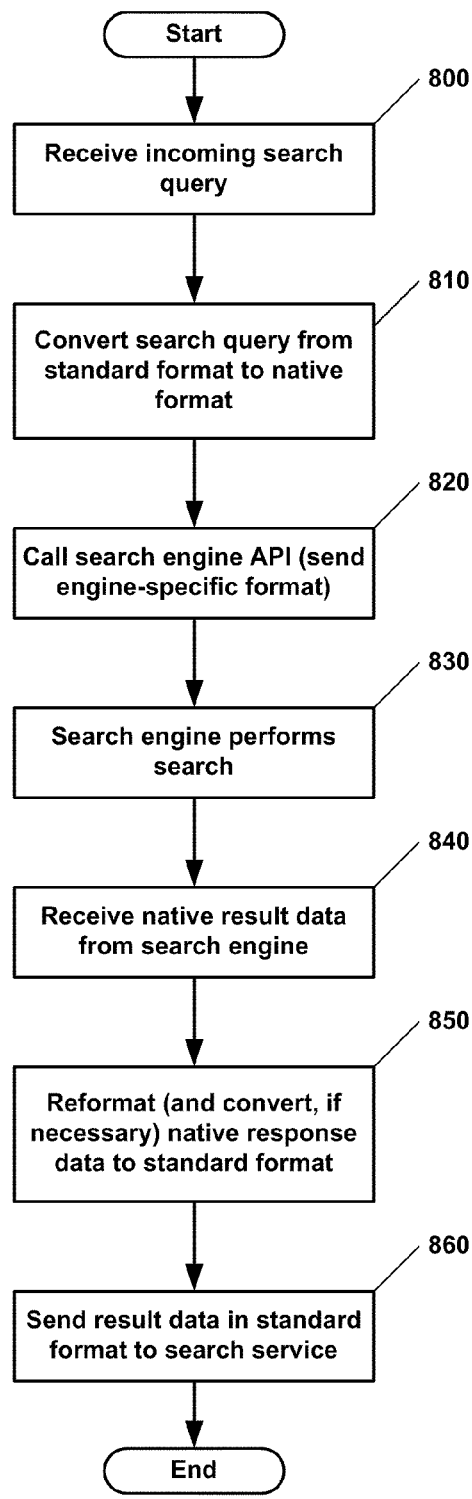
FIG. 8 is a flow diagram illustrating the operations performed in processing a search query according to an embodiment of the present invention.

FIG. 8 depicts a flow diagram according to the present invention, in which an example of search engine adapter processing is described in further detail. Such search engine adapter processing begins with the receipt of an incoming search request, such search request being in the requisite format (and preferably, a standard generic format) (step 800). The search engine adapter receives the incoming search query at a generic search adapter, which then reformats the search query to an engine-specific format and passes the search query to an engine specific adapter (step 810). In so doing, the search engine adapter converts the search query from the standard format provided by the search services into a format that can be passed to the search engine API (step 820). As is depicted in FIG. 3, and as will be appreciated from FIG. 4A, the search services can communicate this information to one or more of the search engine adapters. Similarly, a given generic search adapter can communicate with one or more engine specific adapters, such that a given search engine adapter may include one or more generic search adapters and one or more engine specific adapters. Thus, FIGS. 3 and 4A are simply two examples of the many possible architectures that may be used to implement embodiments of the present invention.

Once called, the search engine API commands (sent to the search engine in the engine's native format) cause the search engine to perform the requested search (step 830). Once the search has been performed, the search engine adapter receives the native result data from the search engine at an engine specific adapter that is configured to receive these results (step 840). The search engine adapter (via the engine specific adapter and generic search adapter) then reformats (and converts, if necessary) the native response data into the standard format for presentation to the search service (step 850). This result data is then sent in the standard format to the search service (step 860).

Figure 9A:
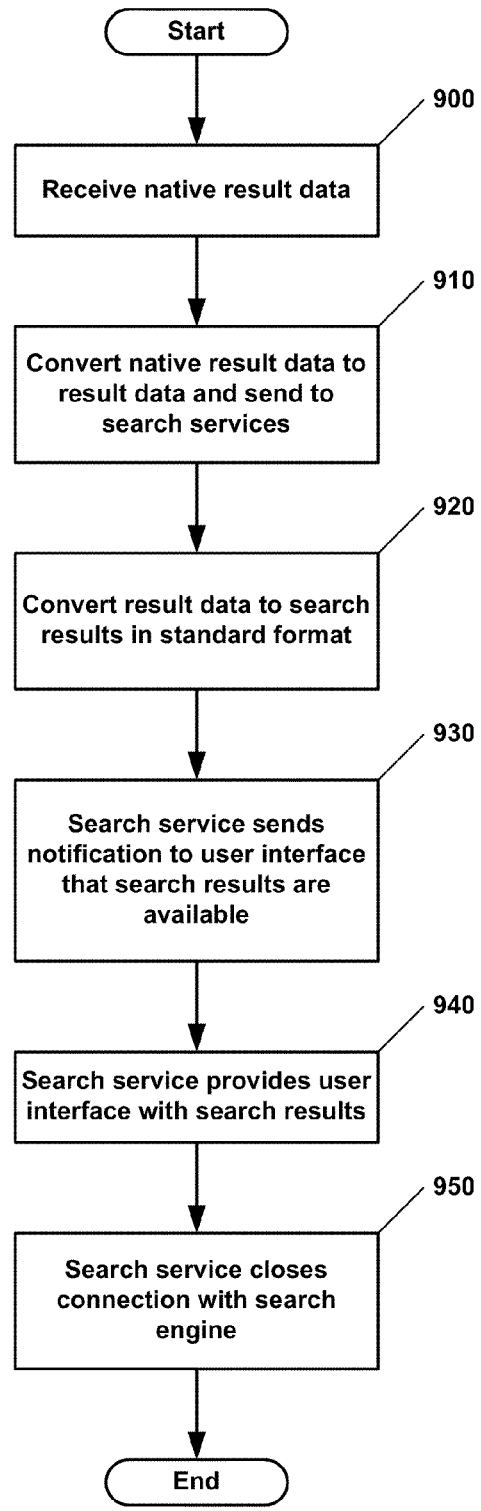
FIG. 9A is a flow diagram illustrating the operations performed in processing a search result according to an embodiment of the present invention.

FIG. 9A is a flow diagram depicting an example of a process of conversion of search results from native results data (e.g., native result data 265 and native result data 355) to search results (e.g., search result 275 and search result 325) by a search server (e.g., search server 315 or search server 415) in further detail. In the embodiment depicted in FIG. 9, the conversion of native result data to search results is performed by a search server, which begins with the receipt of native results data from the search engine, at the search engine adapter on the search server (step 900). The data obtained and provided by the search engine is then converted from the native result format by the search engine adapter, and provided to the search services (step 910). Once provided to the search services, the result data is converted into search results in a standard format, such as property sets (step 920). In one embodiment, this step also includes ordering results in response to an order of display priority created in response to the content of a user profile. Once the conversion to a format acceptable to the user interface has been performed, the search service sends a notification to the user interface that the search results are available to the user interface (step 930). On the request of the user interface, the search service provides user interface with the search results (step 940). In order to maintain efficiency and performance for the system of the present invention, the search service can then close the connection between the search server and the search engine server (step 950).

Figure 9B:
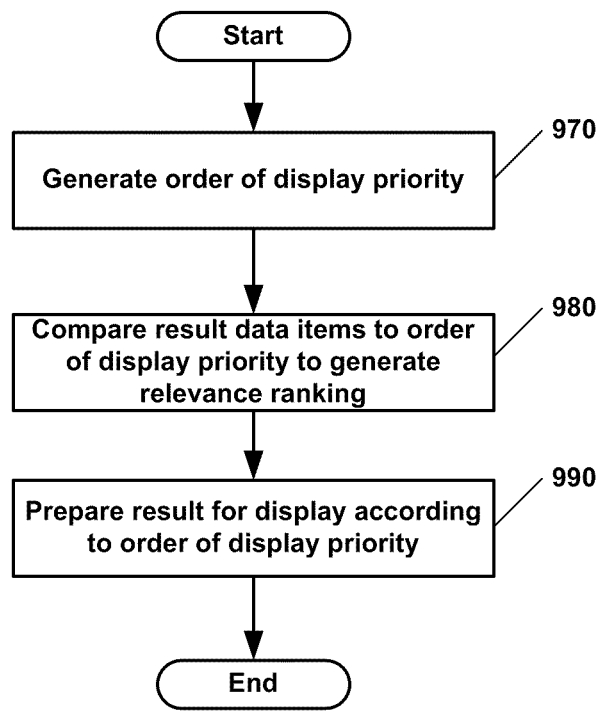
FIG. 9B is a flow diagram illustrating the operations performed in processing a search result according to an embodiment of the present invention.

FIG. 9B is a flow diagram illustrating the operations performed in processing a search result according to an embodiment of the present invention. FIG. 9B provides one embodiment of the details of steps performed in step 920 of FIG. 9A. An order of display priority is generated from a user profile (step 970). Result data items from native result data are compared to the order of display priority to generate a relevance ranking (step 980). A result is prepared for display according to the order of display priority via the relevance ranking, typically by ordering the result data items in the order suggested by the relevance ranking (step 990).

Figure 9C:
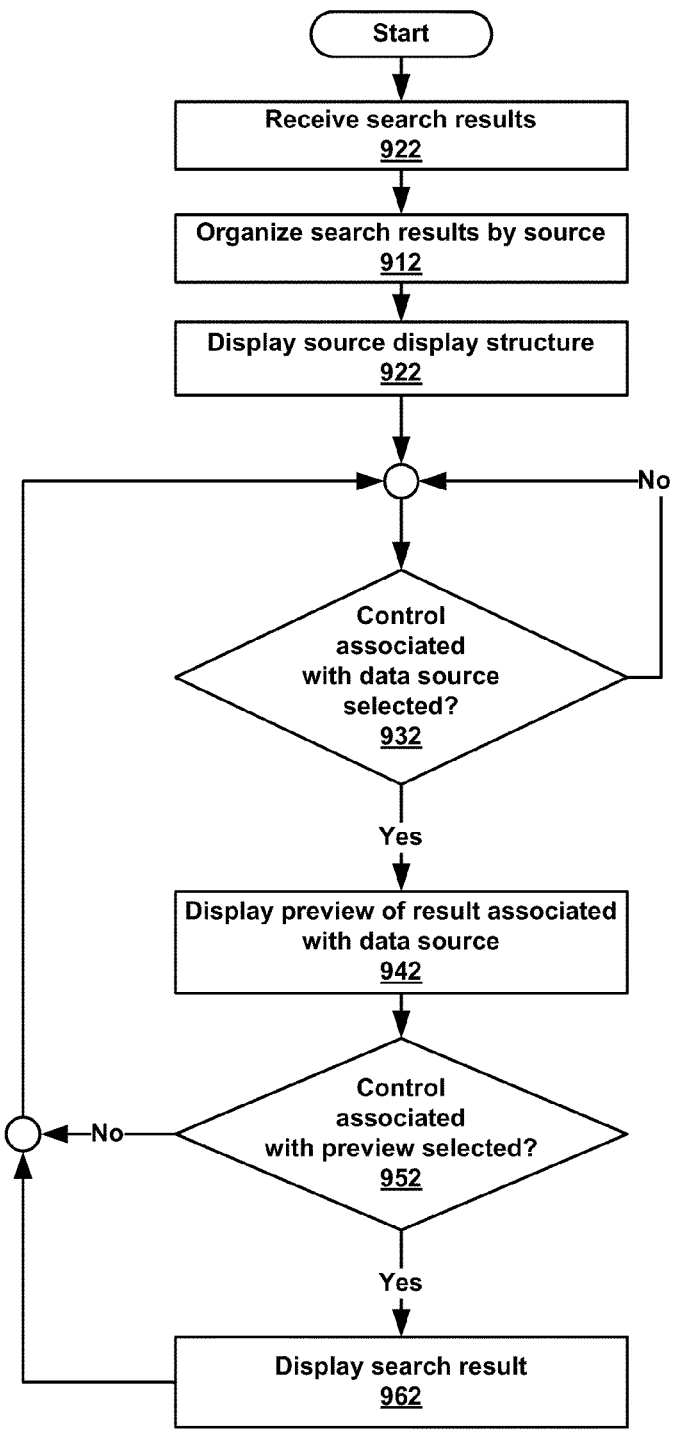
FIG. 9C is a flow diagram illustrating the operations performed in processing a search result according to an embodiment of the present invention.

FIG. 9C is a flow diagram illustrating the operations performed in a user interface processing a search result according to an embodiment of the present invention. Search results are received (step 902). Results are organized by source (step 912). A source display structure is then displayed (step 922). A determination is made as to whether a control associated with a source has been selected (step 932). If a control associated with a source has been selected, a preview of the result associated with the data source is displayed (step 942). A determination is made as to whether a control associated with the preview has been selected (step 952). Responsive to the selection of the control associated with a preview, source data associated with a search result is displayed (step 962).

Figure 10A:
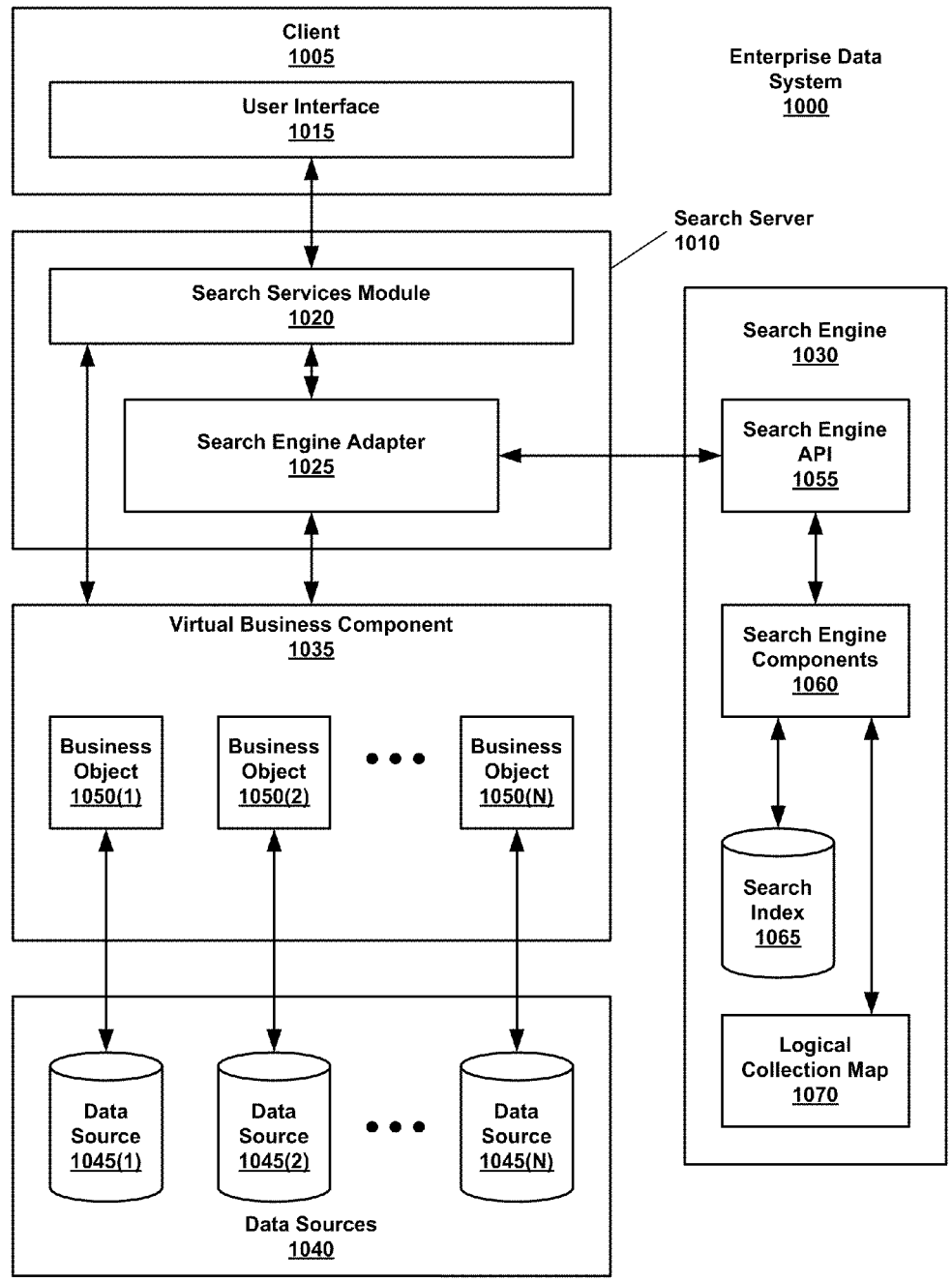
FIG. 10A is a block diagram illustrating an enterprise data system according to an embodiment of the present invention.

FIG. 10A is a block diagram of an enterprise data system 1000 according to embodiments of the present invention. Enterprise data system 1000 includes a client 1005 that is configured to communicate with a search server 1010. Client 1005 sends search requests in a generic request format to search server 1010. Client 1005 presents information to be sent to search server 1010 and information received from search server 1010 via a user interface 1015, in the manner described earlier herein. As also described earlier, search server 1010 includes search services module 1020 and a search engine adapter 1025, which are in communication with one another, as well as the search engine 1030 and a virtual business component 1035.

Virtual business component 1035 is in communication with data sources 1040, which include data sources 1045(1)-(N). In one embodiment, a user profile can indicate a user preference for data from a particular data source by recording user responses to results from that data source. In one embodiment, virtual business component 1035 includes a number of business objects 1050(1)-(N). As depicted in FIG. 10, each of data sources 1045(1)-(N) is presented to search server 1010 by one of business objects 1050(1)-(N). In one embodiment, a user profile can indicate a user preference for data from a particular one of business objects 1050(1)-(N) by recording user responses to results from that one of business objects 1050(1)-(N). In the context of this aspect of the present invention, business objects 1050(1)-(N) can be viewed as logical tables, which, in some embodiments, can then either represent (or even store) data retrieved from their respective data sources (or metadata representing the data in the given data source). For example, such business objects can be implemented using structured query language (SQL) tables.

Embodiments such as those described herein provide a number of advantages. For example, it will be appreciated that, if such a structure becomes relatively large (i.e., includes a relatively large number of records), performing searches could become cumbersome, because such searches would take a relatively long time (if individual tables were searched) and/or would often result in an inordinately large number of hits (if all or a large number of such tables were searched globally), or some combination thereof. This is particularly problematic if an enterprise application focuses primarily on an individual business object when searching, which requires a large number of searches because each business object must be searched in such a scenario. Since many enterprises distribute information across multiple business objects, this can lead to gross inefficiency, resulting from the need to perform numerous searches or large global searches. Embodiments of the architecture presented herein address these challenges, in part through its ability to employ search indices according to various embodiments.

Two general types of search indices are global indices and individual indices. A global search index (or, more simply, a global index) is one large search index that indexes all the business objects to which the search engine has access. Searches using a global index typically return large number of results (basically, all such results), because effectively all data sources are searched. Alternatively, an individual index is provided. An individual search index (or, more simply, an individual index) indexes a particular business object individually. In this case, then, the search engine accesses only the individual search index for the desired business object. In order to search more than one such data source using such an index alone, more than one search must therefore be performed by the user.

In a system according to embodiments of the present invention, however, such issues are addressed through the use of logical collections of business objects. These logical collections logically group business objects together for purposes of searching. In the case of a global index, such a search returns only references from those business objects in the logical collection by filtering out those references for business objects not in logical collection. In the case of an individual index, the search engine need access individual search indices only for those business objects in the logical collection. A search on a global index or individual index may require an engine-specific format different from the format of a search request.

An application according to embodiments of the present invention supports the definition of any number of logical collections, even if each requires a distinct engine-specific format. In such embodiments, search indexing is typically done at the individual business object level, although such an indexing approach is not mandatory. As will be apparent from the present discussion, when a search is executed on a logical collection, the results from the search engine are based on hits from any of the business objects within the logical collection. The implementation and use of logical collections thus allows for the searching of data from multiple business objects using a single search. This reduces the number of searches a user would otherwise have to perform to get to the requisite information.

The use of a logical collection begins with the logical collection's definition. By defining a logical collection, the user defines the collection of business objects to be searched. To search a logical collection, the identifier for logical collection (the logical collection identifier or LCID) is used to access the appropriate LCID entry in a given logical collection table (also referred to herein as a logical collection map) within the search engine. The logical collection table maps a logical collection (using the LCID) to the business object(s) represented therein using one or more business object identifiers (BOIDs).

As will be appreciated in light of the present discussion, such logical collection tables can be made customizable, and so can include any number of LCIDs, each of which can be a collection of any of the business objects available to the user for searching. This allows the user interface to display, and the user to select, one or more business objects (e.g., as a list of BOIDs, text representing each BOID or business object, or the like) and logical collections (e.g., as a list of LCIDs, text representing each LCID or logical collection, or the like) for searching. Alternatively, some embodiments of the present invention allow logical collections to be selected for searching based on content of a user profile. Thus, a logical collection can be selected for searching based on favorable user response to results obtained from the selected logical collection.

In operation, one or more keywords and LCID are sent to the appropriate search engine. The search engine uses the LCID as an index into the appropriate logical collection table to identify the business object(s) to be searched (as identified by their respective BOID). The search engine then performs the requested search. The operations performed depend on the type of search to be performed, which in turn depends on the search index to be employed.

In the case of a global search, the search engine uses a global search index, which returns all results that satisfy the given search. These results are then filtered using the business object identifier (the BOID, as specified by the given LCID) and record number (from the reference identified by the keyword) to choose records that satisfy the search. Thus, given the requisite keyword(s) and LCID, the search engine uses the LCID to identify the business object(s), and the keyword(s) to identify the record(s), from which results are to be provided to the user. The user thus receives the desired results, via the user interface, only from the business object(s) in the logical collection.

In the case of an individual search, the search engine uses the individual indices for the business object(s) identified by the selected logical collection. Using the LCID which identifies the selected logical collection, the business object(s) identified by the BOID(s) of the logical collection are searched using the given keywords. This identifies one or more references into each of the business objects identified by the logical collection. Each of these references refers to a record in its respective business object(s), allowing retrieval of this information to satisfy the given search. Thus, when using individual search indices, the LCID and keyword(s) combination allows for the identification of the requisite business object(s) and record(s) therein.

It should be noted that, while the present depiction is certainly within the scope of the present invention, the data abstraction layer provided by virtual business component 1035 does not require such a one-to-one correspondence. Multiple business objects can thus be used to represent a single data source, and conversely, multiple data sources can be represented by a single business object. In the manner previously discussed, data sources 1045(1)-(N) can be any number and type of sources of data, metadata, databases and other such sources of data.

As can be seen in FIG. 10A, as in earlier figures, search services module 1020 and search engine adapter 1025 are able to access virtual business component 1035, in the embodiment depicted in FIG. 10A. Search server 1010, via search engine adapter 1025, also accesses search engine 1030 via a search engine API 1055. Search engine API 1055, in turn, is presented as an interface to search engine components 1060. Search engine components 1060 perform the requisite searching using search indices, the storage of which is depicted in FIG. 10A as a search index 1065. Search engine components 1060 also have access to a logical collection map 1070. Search indices such as search index 1065, in combination with logical collection map 1070, permit search engine components 1060 to perform searches of data sources 1045 (1)-(N), as indexed by each search engine, in a fast and efficient manner.

Figure 10B:
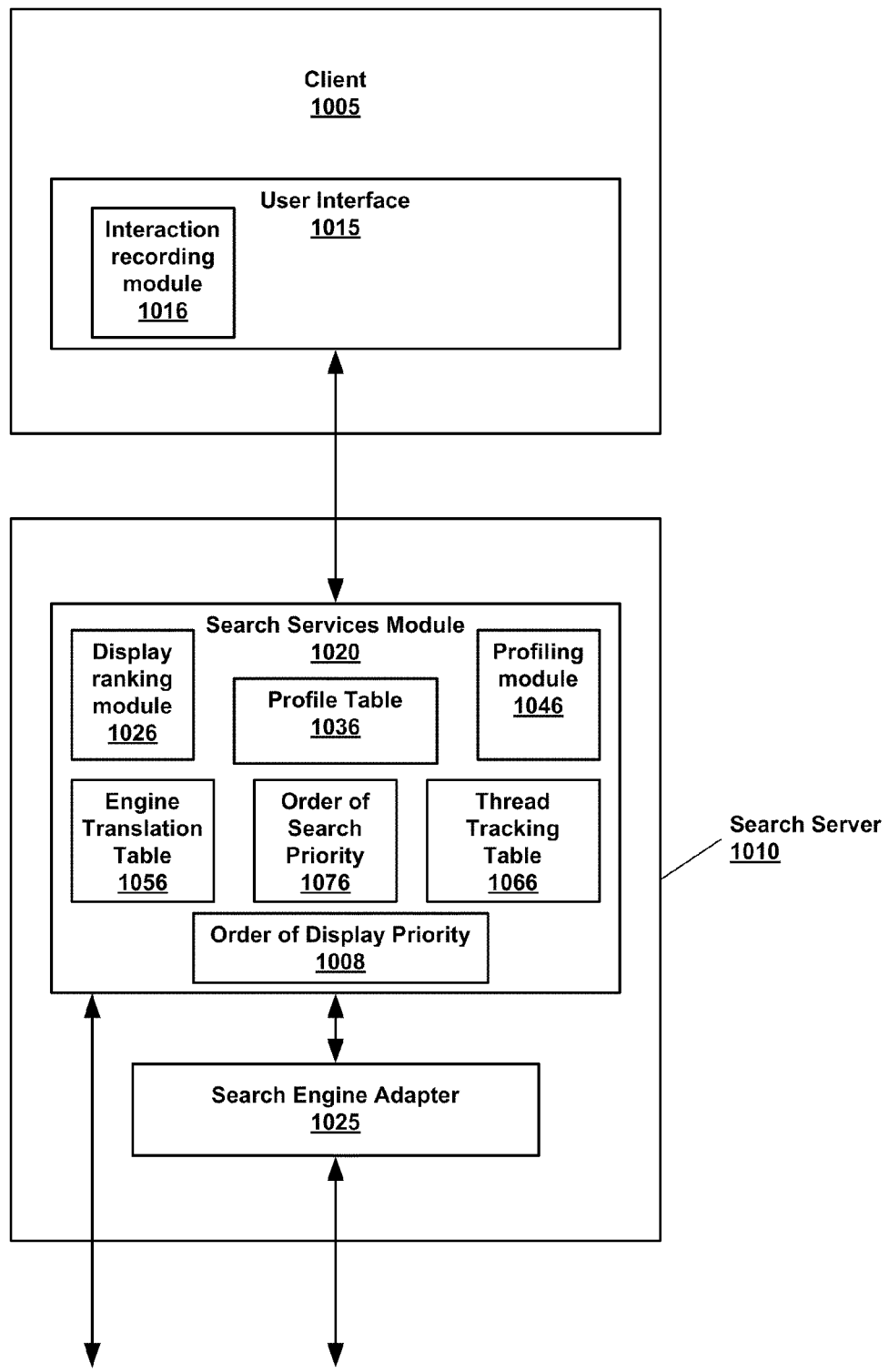
FIG. 10B is a block diagram illustrating additional components of an enterprise data system according to an embodiment of the present invention.

FIG. 10B is a block diagram illustrating additional components of an enterprise data system according to an embodiment of the present invention. As in FIG. 10A, a client 1005 includes a user interface 1015. User interface 1015 displays search results. User interface 1015 includes an interaction recording module 1016 for capturing user responses to result data items. In one embodiment, capturing a user response to result data items includes:

recording a user identifier associated with a user,
recording a user characteristics associated with a user,
recording search characteristics associated with a search for which a search result was generated,
recording a selection from the first search result,
recording a data source associated with the selection,
recording a plurality of characteristics of the selection, and
recording a disposition of the first selection, such as closing the selected reference or selecting a second reference.

In one embodiment, recording the disposition of a selection includes recording a source request for reference data associated with the selection, recording a length of time that the selection was displayed to the user, and recording a data item representing whether the user made a second selection after the current selection. Recording search characteristics associated with the search for which the result was generated can include, for example, recording search keywords. Recording the selection from the search result can also include recording metadata associated with the first selection. Such metadata can include items such as a record type associated with the selection, a unique record identifier associated with the selection, and a business component associated the selection, for example.

As in FIG. 10A, a search server 1010 includes a search services module. The search services module includes a profile table 1036 for storing user profiles, such as the user profile described below with respect to FIG. 10C, and a profiling module 1046 for generating user profiles and augmenting (or updating) user profiles after receiving user responses to search results. Such augmenting includes, in one embodiment, the update of a last-used timestamp, the recording of user responses over time, the appendment of additional keywords, and the incrementing of selection counters. A display ranking module 1026 receives search results from search engine adapter 1025, creates an order of display priority 1008, prepares relevance rankings, and sorts and processes search results on the basis of the relevance ranking and order of display priority, thereby enabling user interface 1015 to display search results according to the order of display priority based on the user profile. An order of display priority 1008 can be generated on the basis of a user profile within profile table 1036, and, in some embodiments, an order of display priority 1008 can be generated on the basis of multiple user profiles that share common characteristics. For instance, if multiple users in a workgroup, such as human resources, run similar searches and select similar results from recurring references, an order of display priority based on multiple user profiles can indicate a preference for results from those references, even for a new user who has never run a search before.

An order of search priority 1076 is used to select search engines to which search queries are sent. An order of search priority 1076 can be generated on the basis of a user profile within profile table 1036, and, in some embodiments, an order of search priority 1076 can be generated on the basis of multiple user profiles that share common characteristics. For instance, if multiple users in a workgroup, such as human resources, run similar searches and select similar results from recurring references, an order of search priority 1076 based on multiple user profiles can indicate that a search needs to be run on those references, even for a new user who has never run a search before or who has selected that the references not be used. A thread tracking table is used for tracking the status of open communication threads (e.g., thread opened, query sent, response received, thread closed, and elapsed time). Finally, an engine translation table 1056 includes data enabling the translation of a search request in a request format using a generic naming schema to a set of engine-specific search queries in different formats and using different naming schemas.

Figure 10C:
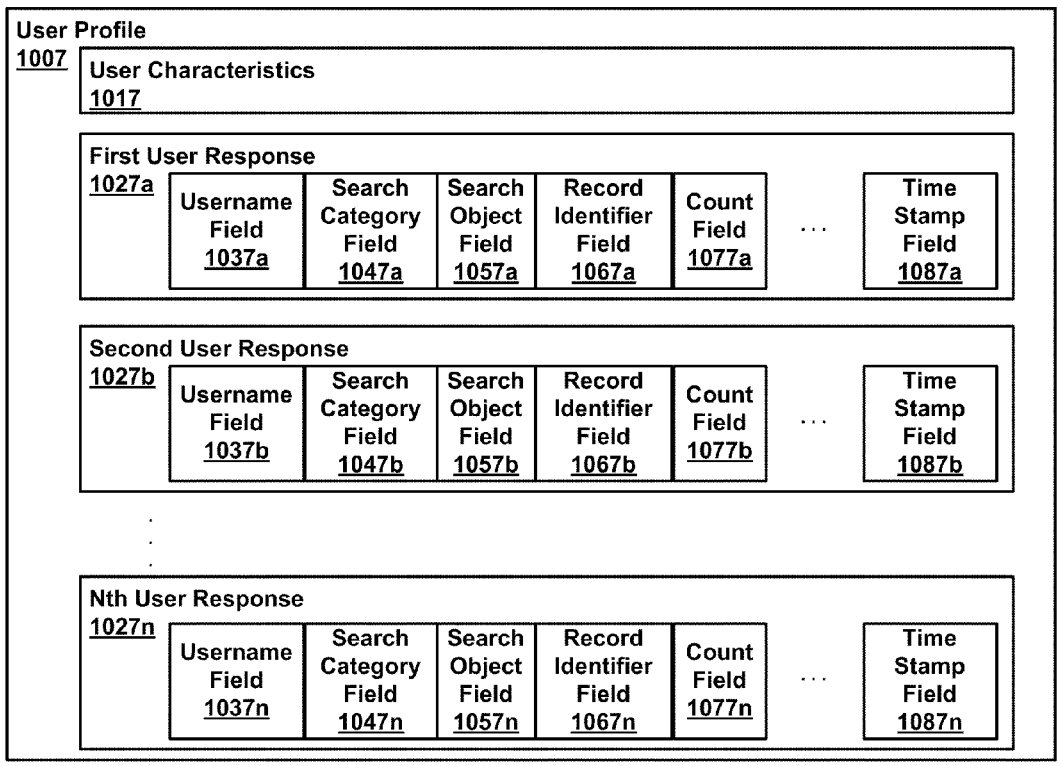
FIG. 10C is a block diagram illustrating data structures used by an enterprise data system according to an embodiment of the present invention.

FIG. 10C is a block diagram illustrating a user profile used by an enterprise data system according to an embodiment of the present invention. In one embodiment, user profile 1007 is stored in a profile table 1036 of FIG. 10B. User profile 1007 includes a data structure for user characteristics 1017, the contents of which will vary significantly from embodiment to embodiment of the present invention. User characteristics 1017 include, in some embodiments, a username, job function, organizational information, and any other data related to a user that can be used for identifying the ways in which one user is similar to another. Thus, when, in some embodiments, results are ranked on the basis of user information, those results can be ranked on the basis of the relevance of the search results of a user with user information similar to that of the user requesting the current search.

User profile 1007 further includes user responses 1027*a-n*. Each of user responses 1027*a-n* is a data structure documenting the response of a user to a search result. In one embodiment, each of user responses 1027*a-n* includes a username field 1037*a-n*, identifying the user associated with the response data structure. Each of user responses 1027*a-n* includes a search category field 1047*a-n*, identifying search parameters, such as a search type, collection limitations, or other search characteristics associated with a search for which a search result was generated and for which the response associated with the selected one of user responses 1027*a-n* was recorded. Each of user responses 1027*a-n* includes a search object field 1057*a-n*, identifying search parameters, such as a search string or other search characteristics associated with a search for which a search result was generated and for which the response associated with the selected one of user responses 1027*a-n* was recorded. Each of user responses 1027*a-n* includes a record identifier field 1067*a-n*, identifying a record for which the response associated with the selected one of user responses 1027*a-n* was recorded. Each of user responses 1027*a-n* includes a count field 1077*a-n*, identifying the number of times that the record for which the response associated with the selected one of user responses 1027*a-n* was recorded has been accessed. Each of user responses 1027*a-n* includes a timestamp field 1087*a-n*, identifying the time of the most recent access or accesses for the record for which the response associated with the selected one of user responses 1027*a-n* was recorded. Additional fields (not shown) can be included in user profile 1007 and used to capture additional data, discussed below with respect to FIG. 13A, that will vary between embodiments of the present invention.

Figure 10D:
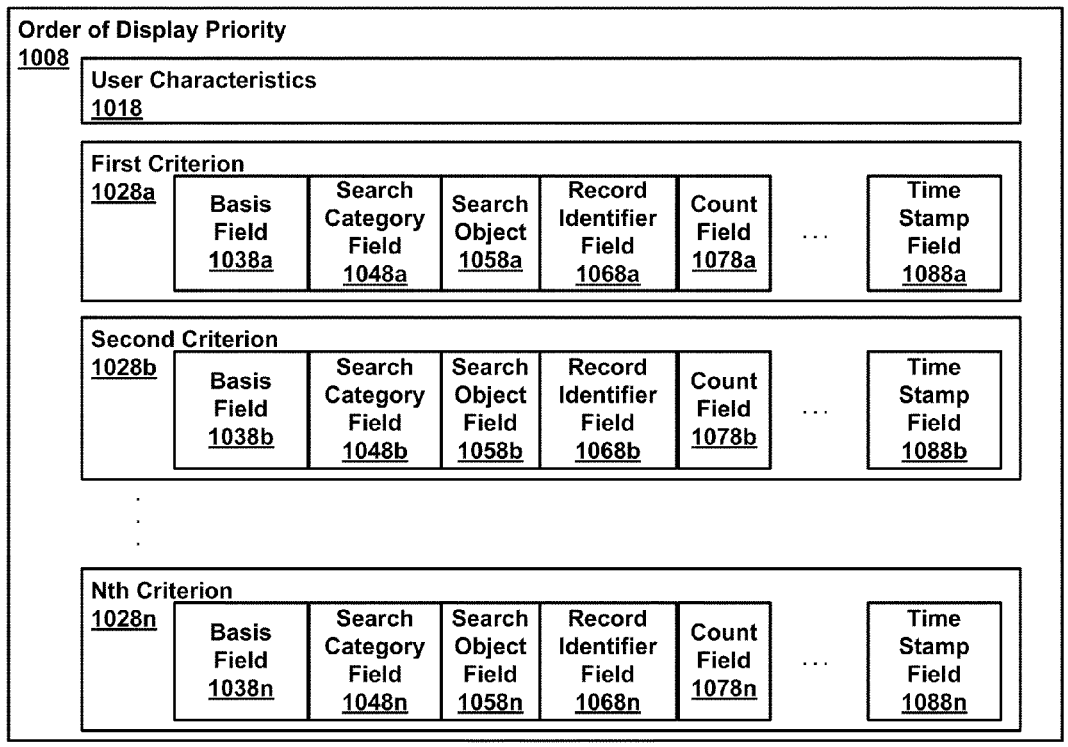
FIG. 10D is a block diagram illustrating data structures used by an enterprise data system according to an embodiment of the present invention.

FIG. 10D is a block diagram illustrating an order of display priority used by an enterprise data system according to an embodiment of the present invention. Order of display priority 1008 includes a data structure for user characteristics 1018, the contents of which will vary significantly from embodiment to embodiment of the present invention. User characteristics 1018 include, in some embodiments, a username, job function, organizational information, and any other data related to a user that can be used for associating order of display priority 1008 with one or more particular users. Thus, when, in some embodiments, results are ranked on the basis of user information, those results can be ranked on the basis of the relevance of the search results of a user with user information similar to that of the user requesting the current search.

Order of display priority 1008 further includes criteria 1028*a-n*. Each of criteria 1028*a-n* is a data structure documenting the impact of a particular characteristic on the relevance ranking of a search result displaying the characteristic. In one embodiment, each of criteria 1028*a-n* includes a basis field 1038*a-n*, identifying the impact of a particular characteristic on the relevance ranking of a search result exhibiting that characteristic. In one embodiment of the present invention, in which rankings are an ordered list with no numerical scoring, basis fields 1038*a-n* contain instructions to promote or demote a particular result on the basis of having a characteristic matching the selected one of criteria 1028*a-n*. In another embodiment of the present invention, in which rankings are numerical scores, basis fields 1038*a-n* contain instructions to perform a mathematical operation (e.g., adding or subtracting points or multiplying or dividing an existing score) on a score associated a particular result on the basis of having a characteristic matching the selected one of criteria 1028*a-n*. Alternative embodiments, each tailored to the ranking methodology used by a particular search and retrieval system, are also within the scope of the present invention.

Each of criteria 1028*a-n* includes a search category field 1048*a-n*, identifying search parameters, such as a search type, collection limitations, or other search characteristics for identifying a search result with which the response indicated in the basis from among basis fields 1038*a-n* is associated. Each of criteria 1028*a-n* includes a search object field 1058*a-n*, identifying search parameters, such as a search string or other search characteristics identifying a search result with which the response indicated in the basis from among basis fields 1038*a-n* is associated. Each of criteria 1028*a-n* includes a record identifier field 1068*a-n*, identifying a record with which the response indicated in the basis from among basis fields 1038*a-n* is associated. Each of criteria 1028*a-n* includes a count field 1078*a-n*, identifying the number of times that the criterion 1027*a-n* has been employed. Each of user responses 1028*a-n* includes a timestamp field 1088*a-n*, identifying the time of the most recent employment of the criteria 1027*a-n*. Where appropriate to the criteria 1027*a-n* under consideration, one or more of search category field 1048*a-n*, search object field 1058*a-n* and record identifier field 1068*a-n* may list a null value.

Figure 10E:
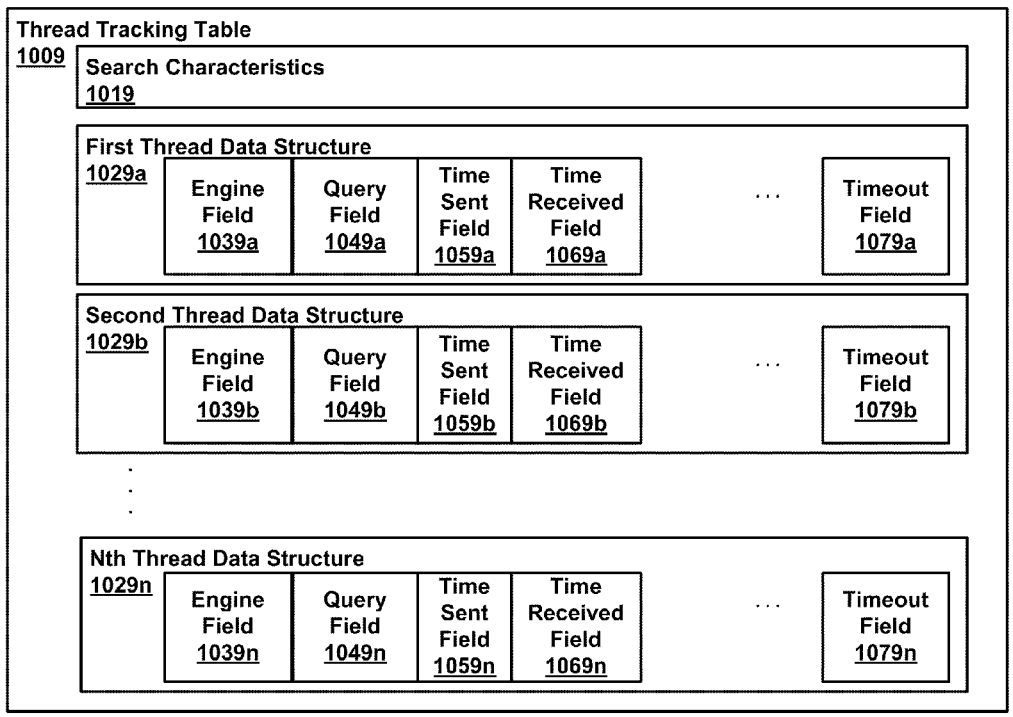
FIG. 10E is a block diagram illustrating data structures used by an enterprise data system according to an embodiment of the present invention.

FIG. 10E is a block diagram illustrating thread tracking table data structures used by an enterprise data system according to an embodiment of the present invention. A thread tracking table 1009 is used to track open communication threads. In one embodiment, thread tracking table 1009 can also be used to track the long-term performance of individual search engines, and search engines can be selected for a search based on data contained in thread tracking table 1009. Thread tracking table 1009 includes a set of search characteristics 1019 identifying information associated with the generic search request for which each of thread data structures 1029*a-n* represents an engine-specific query. The content of search characteristics can vary significantly from embodiment to embodiment. In one embodiment, the content will include a search query and notations of engine selections. Additionally, in some embodiments, the content can include, for example, a username, job function, organizational information, and/or other data related to a user.

Each of thread data structures 1029*a-n* represents an engine-specific query associated with the search described in search characteristics 1019. Each of thread data structures 1029*a-n* includes an engine field 1039*a-n*, for a designator identifying an engine with which communication is tracked. Each of thread data structures 1029*a-n* further includes a query field 1049*a-n* for storing a query sent to the engine. In some embodiments, a response to the query can also be appended to the content of the field for query 1049*a-n*. Each of thread data structures 1029*a-n* can additionally include a time sent field 1059*a-n* for a designator identifying the time at which the query indicated in 1049*a-n* was sent to the one(s) engine(s) with which communication is tracked. Similarly, each of thread data structures 1029*a-n* can additionally include a time received field 1059*a-n* for a designator identifying the time at which a response to the query was received from the engine with which communication is tracked. Finally, a timeout field 1079*a-n* is used to indicate the remaining time for the engine 1039*a-n* to respond to the query 1049*a-n* or indicates, after receipt of a response or the expiration of a timeout period, whether the response was timely.

Figure 10F:
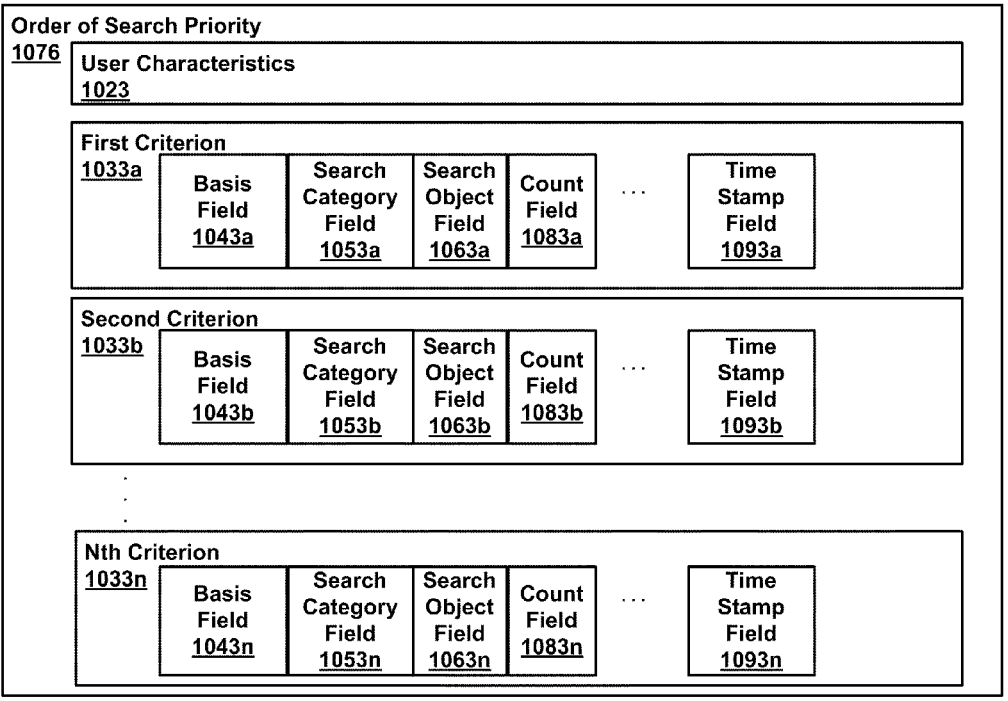
FIG. 10F is a block diagram illustrating data structures used by an enterprise data system according to an embodiment of the present invention.

FIG. 10F is a block diagram illustrating an order of search priority used by an enterprise data system according to certain embodiments. Order of search priority 1076 includes a data structure for user characteristics 1023, the contents of which will vary significantly from embodiment to embodiment of the present invention. User characteristics 1023 include, in some embodiments, a username, job function, organizational information, and any other data related to a user that can be used for associating order of search priority 1076 with one or more particular users. Thus, when, in some embodiments, search engines are selected on the basis of user information, those results can be ranked on the basis of the relevance of the search results of a user with user information similar to that of the user requesting the current search.

Order of search priority 1008 further includes criteria 1033*a-n*. Each of criteria 1033*a-n* is a data structure documenting the impact of a particular characteristic on the priority associated with using a search engine for search queries displaying the listed characteristics. In one embodiment, each of criteria 1033*a-n* includes a basis field 1043*a-n*, identifying the specific impact of a particular characteristic on the prior- ity associated with using a search engine for search requests exhibiting the listed characteristics. In another embodiment, one or more engines are selected in an ordered list with no numerical scoring, basis fields 1043*a-n* contain instructions to promote or demote a particular engine on the basis of having a characteristic matching the selected one of criteria 1033*a-n*. In another embodiment of the present invention, in which engine selection is based on numerical scores, basis fields 1033*a-n* contain instructions to perform a mathematical operation (e.g., adding or subtracting points or multiplying or dividing an existing score) on a score associated an engine on the basis of having a characteristic matching the selected one of criteria 1033*a-n*.

Each of criteria 1033*a-n* includes a search category field 1053*a-n*, identifying search parameters, such as a search type, collection limitations, or other search characteristics for identifying a search query with which the action indicated in the basis from among basis fields 1043*a-n* is appropriate. Each of criteria 1033*a-n* includes a search object field 1063*a-n*, identifying search parameters, such as a search string or other search characteristics to which the response indicated in the basis from among basis fields 1043*a-n* is associated. Each of criteria 1033*a-n* includes a count field 1083*a-n*, identifying the number of times that the criterion 1033*a-n* has been employed. Each of user responses 1033*a-n* includes a timestamp field 1093*a-n*, identifying the time of the most recent employment of the criteria 1033*a-n*. Where appropriate to the criteria 1033*a-n* under consideration, one or more of search category field 1053*a-n*, and search object field 1063*a-n* may contain a null value.

Figure 11:
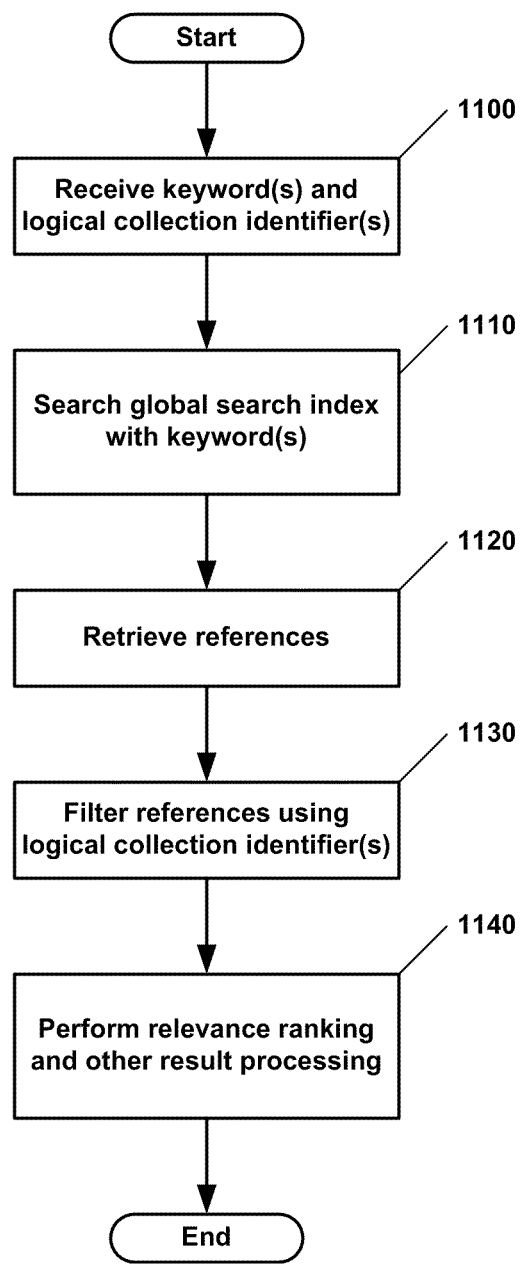
FIG. 11 is a flow diagram illustrating the operations performed in processing a search request using a logical collection according to an embodiment of the present invention.

FIG. 11 is a flow diagram illustrating a process of searching according to embodiments of the present invention that employ a global search index. In the example depicted, a system of the present invention receives keyword(s) and one or more logical collection identifiers at the desired search engine via the search engine's API (step 1100). The search engine then searches the given global search index using the keyword(s) provided (step 1110). References are then retrieved by the search engine from the global search index using the keyword(s) (step 1120). The references thus retrieved are then filtered using the logical collection identifier(s) (step 1130). The logical collection identifier(s) identify the data source(s) (and so, business objects) to be searched, and so the filtering process narrows the results produced to those from the business objects in the given logical collection. By identifying multiple data sources (business objects), the use of a logical collection identifier significantly increases the speed and efficiency with which multiple data sources (business objects) can be searched. Thus, by filtering the references using the logical collection identifier(s), a search engine of the present invention is able to perform search processing more efficiently and reduce the amount of result data (e.g., references) needing to be sent to the search server. Once the references have been retrieved and filtered, the search engine can then perform other result processing such as relevance ranking and the like (1140). Advantageously, such searching requires the user to run only a single search to perform the desired searching.

Figure 12:
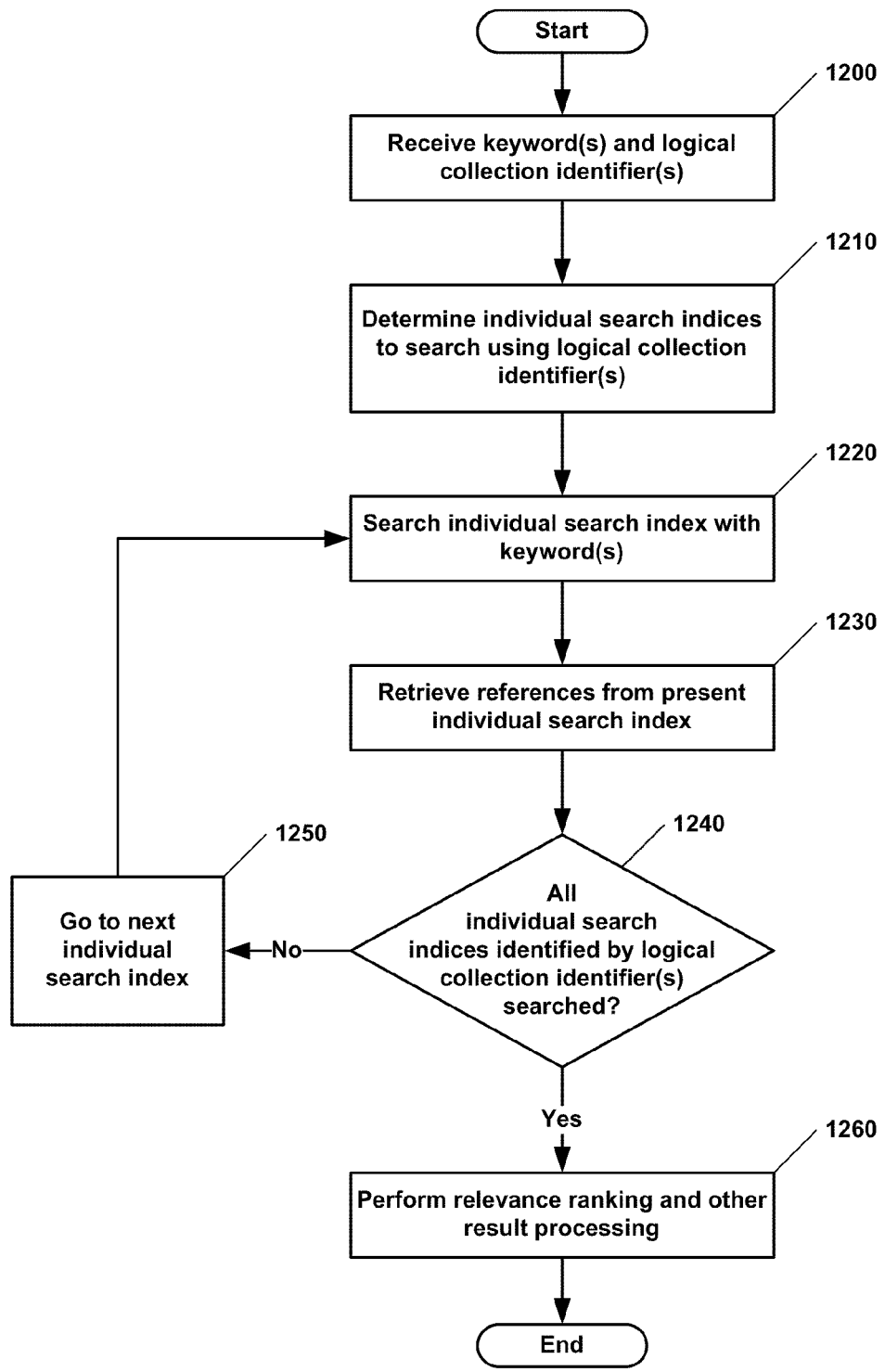
FIG. 12 is a flow diagram illustrating the operations performed in processing a search request using a logical collection according to an embodiment of the present invention.

FIG. 12 is a flow diagram illustrating searching performed according to the present invention using individual search indices. A process according to embodiments of the present invention employing individual search indices begins with the receipt of keyword(s) and logical collection identifier(s) (step 1200). A determination is then made using the logical collection identifier(s) provided as part of the search request, with regard to which individual search indices to search (step 1210). One of the individual search indices identified by the logical collection identifier(s) is then searched using the keyword(s) also provided as part of the search request (step 1220). Using the given keyword(s), references are retrieved from the present individual search index (step 1230). A determination is then made as to whether all of the individual search indices identified by the logical collection identifier(s) have been searched (step 1240). If individual search indices identified by the logical collection identifier(s) remain to be searched, the search engine moves on to the next individual search index (step 1250) and begins searching that individual search index, also using the keyword(s) supplied with the search request (step 1220). If, by contrast, all the individual search indices identified by the logical collection identifier(s) have been searched (step 1240), the search engine performs result processing, such as relevance ranking and other such result processing (step 1260). These steps include, in one embodiment, generating an order of display priority and ranking results based on the order of display priority. Again, advantageously, such searching requires the user to run only a single search to perform the desired searching.

Figure 13A:
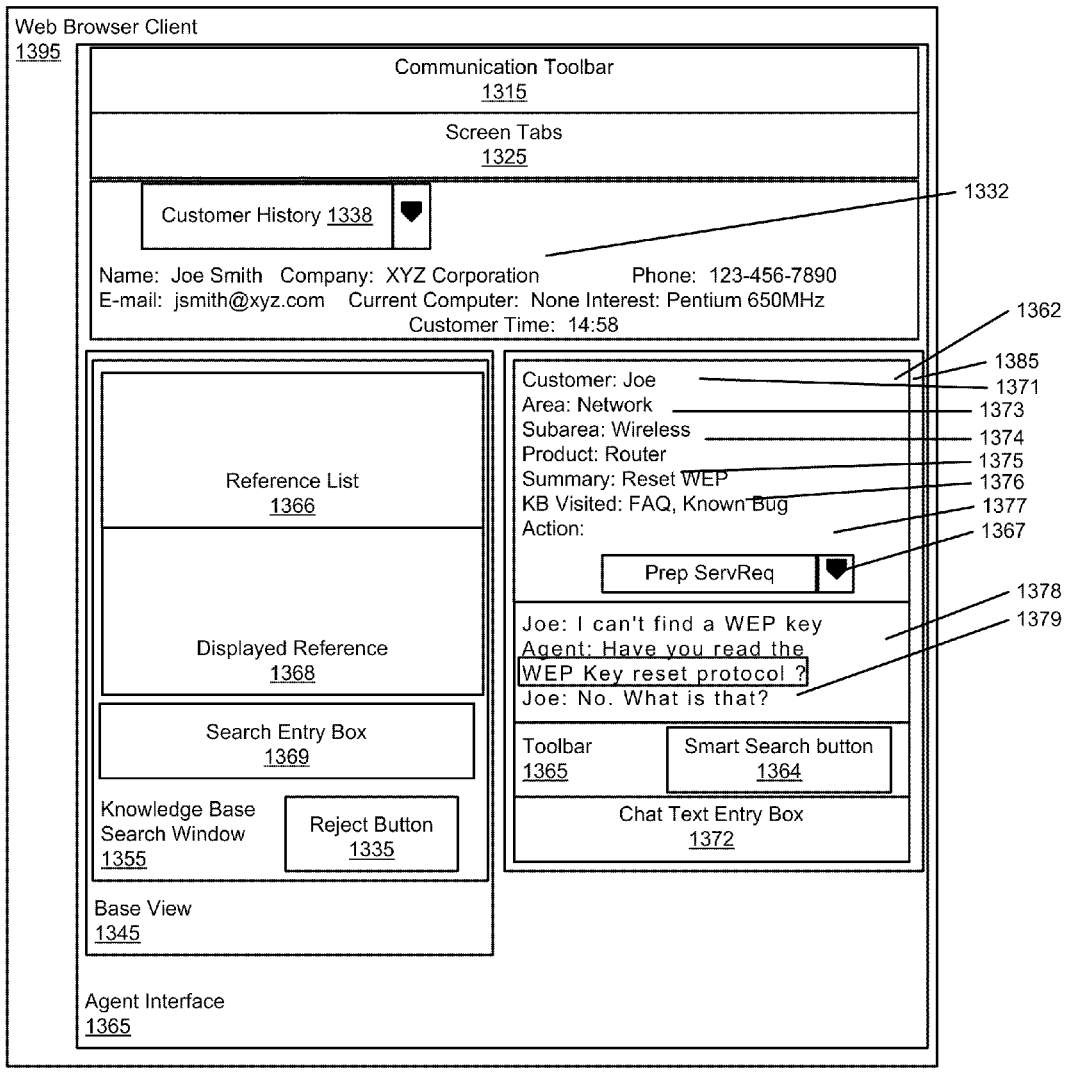
FIG. 13A is a block diagram of a user interface for processing a search request using a logical collection according to an embodiment of the present invention.

FIG. 13A is a block diagram of a user interface for processing a search request using a logical collection according to an embodiment of the present invention. FIG. 13A shows an agent interface 1365 presented for agent use by a web browser client 1395. In one embodiment, no client software other than a web browser is needed to run the agent interface for the host application. Agent interface 1365 can include elements such as a communication toolbar 1315, screen tabs 1325, a persistent dashboard 1332 controlled by a controls pull-down menu 1338, a text communication window 1385 and a base view 1345. Base view 1345 presents a display window in which application data are displayed, such that the dashboard 1332 provides context information related to the application data. Base view 1345 includes a knowledge base search window 1355, in which search results are presented and user response to those results is recorded. Communication toolbar 1315, text communication window 1385 and screen tabs 1325 are not essential for the operation of a knowledge base search window 1355. Knowledge base search window 1355 includes a reference list 1366 and a displayed reference 1368, which are updated based on search results, and responses to which are recorded by agent interface 1365, which is an example of a user interface as discussed above.

Communication toolbar 1332 enables an agent to communicate via multiple types of communication channels, such as e-mail, telephone, facsimile, text chat and wireless messaging. Communication toolbar 1332 enables an agent to navigate between sessions representing multiple users. Screen tabs 1325 enable an agent to navigate among various types of application data.

Text communication window 1385 supports communication between a customer and an agent through text-based messaging. Text communication window 1385 also supports monitoring of communication between a customer and an automated response application, through text-based messaging, such as SMS, which can include transmission of messages containing a markup language such as HTML, for example.

A customer information pane 1362 provides information mined from a session profile, which is determined to be relevant to a customer interaction, such as a username 1371, which may contain any identifier used to communicate with a customer, such as a customer's name, username or handle. An area 1373 broadly represents a product or service type of interest to the customer on the basis of the customer's indication of interest in a request for support or on the basis of data previously stored in relation to the customer and available in the session profile. A subarea 1374 allows for a more narrow definition of the product or service type of interest to the customer on the basis of the customer's indication of interest in a request for support or on the basis of data previously stored in relation to the customer and available in the session profile. A product display field 1375 defines the specific offering of interest to the customer on the basis of the customer's indication of interest in a request for support or on the basis of data previously stored in relation to the customer and available in the session profile. A summary field 1376 provides a brief description of the problem that the customer is trying to solve. KB visited field 1377 indicates the portions of a knowledge base that an automated response server has selected as a potential source for an answer, typically before communicating with a live agent. A knowledge base is, as used in this invention, a body of information, such as a database that contains source material provided in response to a query.

An action pulldown menu 1367 enables an agent to quickly access actions that may be relevant to the customer's situation, such as preparation of a service request, or access files and standard responses that can be sent over the text communication window 1378. A text entry box 1372 allows the agent to enter text for transmission to a customer.

A session window 1378 displays a record of transmissions between an agent and a customer. In the session window 1378, highlighted text 1379 can be selected with a mouse, for a cut-and-paste operation or a search operation. A toolbar 1395 allows for the placement of buttons, such as smart search button 1364, actuation of which causes the execution of a search in which the search string transmitted is the highlighted text 1379 selected by a user. Alternatively, a search entry box 1369 can be used to request a search, and a reject button 1335 can be used to indicate an unacceptable search result has been opened as displayed reference 1368.

When a search is performed, a reference list 1366 is populated with the results of the search, and an agent can select a reference to be shown in a window as displayed reference 1368. Agent interface 1365 records such selections for inclusion in a user profile. While the exemplary embodiment shown in FIG. 10C illustrates a limited number of fields for the sake of simplicity, pointed simply to recording the selection of references, one skilled in the art will readily recognize in light of the present disclosure that any data presented in a user interface, such as the fields displayed in FIG. 13A, as well as the actuation of any controls present in the user interface, may be recorded in additional fields (not shown) of a user profile and used to generate an order of relevance ranking. Such information can include customer communications or attributes, subsequent searches, or subsequent communication to a user.

Figure 13B:
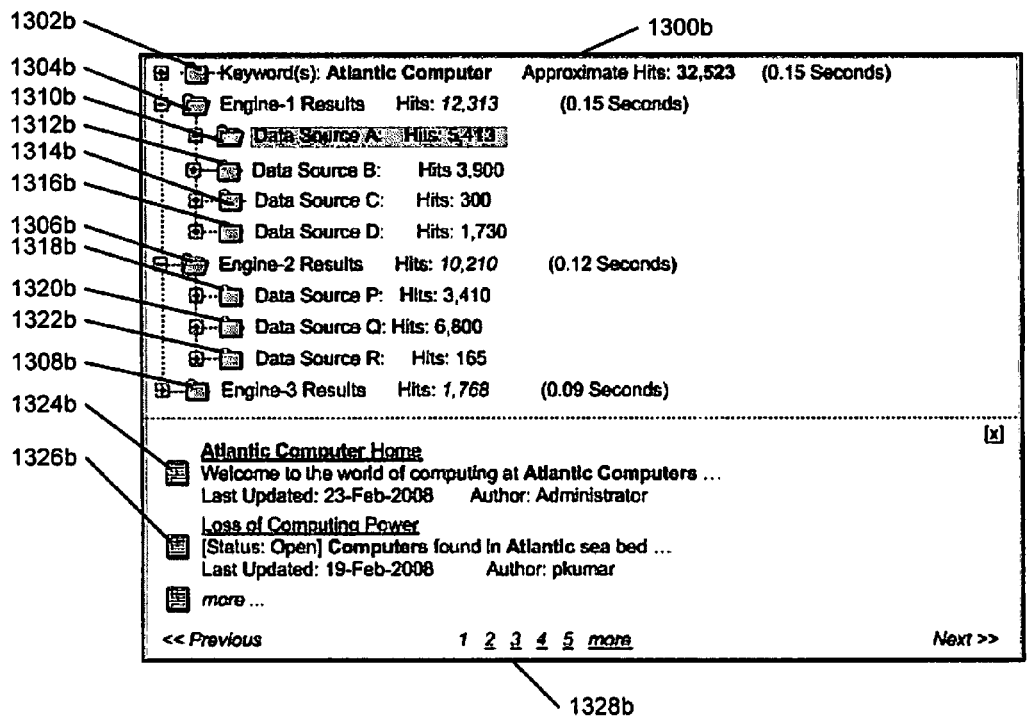
FIG. 13B is a block diagram of a user interface for displaying a search result according to an embodiment of the present invention.

FIG. 13B is a block diagram of a user interface for displaying a search result according to an embodiment of the present invention. Reference list 1366 is split into a source-list pane 1300*b* and a preview window pane 1328*b*. Source-list pane 1300*b* includes search characteristics 1302*b*, first engine results 1304*b*, second engine results 1306*b* and third engine results 1308*b* organized in a tree. First engine results 1304*b* include first source results 1310*b*, second source results 1312*b*, third source results 1314*b* and fourth source results 1316*b*, each of which represents results obtained from a logical collection searched by a first search engine. Similarly, second engine results 1306*b* include fifth source results 1318*b*, sixth source results 1320*b* and seventh source results 1322*b*, each of which represents results obtained from a logical collection searched by a second search engine. In preview window pane 1328*b*, a first preview 1324*b* and a second

1326b display results from first source 1310b, which is highlighted. A first preview 1324b and a second preview 1326b are shown preview window pane 1328b in response to actuation of a control associated with first engine results 1304b.

Using the described embodiments, a single search request is capable of being entered into a single user interface. After the user interface transmits a search request to a search server, the described embodiments provide facilities for converting that single search request into multiple search queries targeted to multiple engines, as described above. Upon receiving results from multiple search engines, the described embodiments can integrate those results into a unified transmission to and presentation on a single user interface, thus saving substantial time previously wasted in presenting multiple search requests at multiple user interfaces and receiving results at those multiple user interfaces. As described with respect to FIG. 13B, results are provided to the user interface for display, and are stored by the user interface until they are selectively displayed preview window pane 1328b in response to actuation of a control.

Figure 13C:
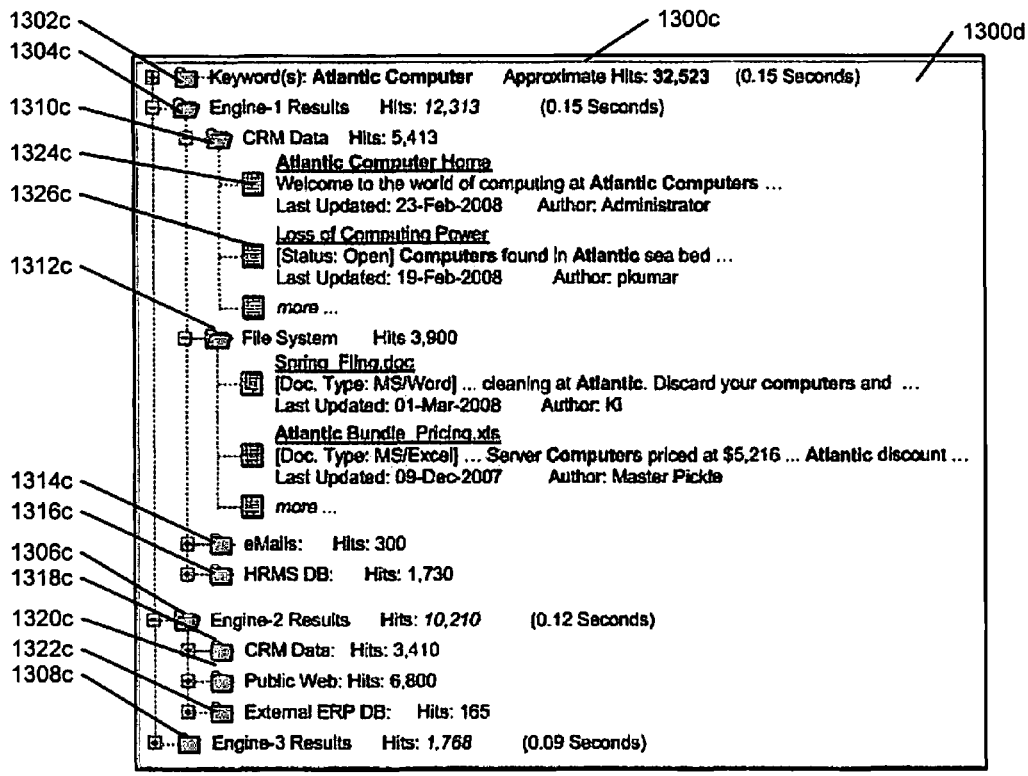
FIG. 13C is a block diagram of a user interface for displaying a search result according to an embodiment of the present invention.

FIG. 13C is a block diagram of a user interface for displaying a search result according to an embodiment of the present invention. Reference list 1366 is displayed in an integrated tree structure 1300c. Integrated tree structure 1300c includes search characteristics 1302c, first engine results 1304c, second engine results 1306c and third engine results 1308c organized in a tree. First engine results 1304c include first source results 1310c, second source results 1312c, third source results 1314c and fourth source results 1316c, each of which represents results obtained from a logical collection searched by a first search engine. Actuation of an icon control (such as clicking on or near the name of one of first source results 1310b, second source results 1312b, third source results 1314b and fourth source results 1316b causes an expansion or collapse of the display of results associated with the source. Such an expansion or collapse of display of results associated with the source may be recorded in a user profile. A first preview 1324c and a second preview 1326c display results from first source 1310c are shown inline as part of integrated tree structure 1300c. First preview 1324c and second preview 1326c are shown in response to actuation of a control associated with first engine results 1304c. Similarly, second engine results 1306c include fifth source results 1318c, sixth source results 1320c and seventh source results 1322c, each of which represents results obtained from a logical collection searched by a second search engine. A preview pane control 1300d, is presented. Actuation of preview pane control 1300d results in disappearance of preview pane control 1300d results in the display of a preview pane, which is detailed below with respect to FIG. 13D.

Figure 13D:
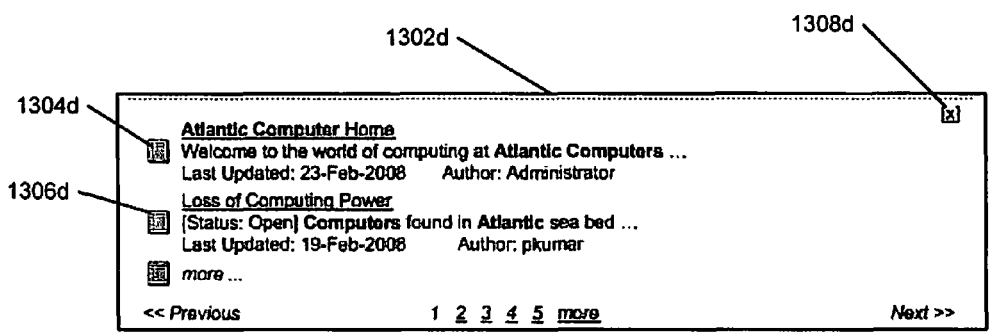
FIG. 13D is a block diagram of a user interface for displaying a search result according to an embodiment of the present invention.

FIG. 13D is a block diagram of a user interface for displaying a search result according to an embodiment of the present invention. In one embodiment preview pane 1302d is displayed as a window separate from the window in which integrated tree structure 1300c of FIG. 13C is displayed. Alternative embodiments include embodiments in which preview pane 1302d shares a window with integrated tree structure 1300c of FIG. 13C. Preview pane 1302d displays a first reference 1304d and a second reference 1306d. Preview pane 1302d further includes a display toggle 1308d for suspending the display of preview pane 1302d. In one embodiment, references from only one engine or data source are displayed in preview pane 1302d. In a second embodiment, references from all engines or data sources displayed in integrated tree structure 1300c of FIG. 13C are displayed in preview pane 1302d. In a third embodiment, controls are provided to enable a user to indicate the engines or data sources in integrated tree structure 1300c of FIG. 13C from which references are displayed in preview pane 1302d.

The display controls illustrated in FIGS. 13B-D provide the user with the ability to interact with results provided by multiple data sources as part of an integrated presentation of data. Specifically, the ability to select a data source through actuation of a visual control, view result previews from that source, and then actuate a second control to cause retrieval of the detail of that source, is provided by the icons displayed in FIGS. 13B-D and associated with the associated source results.

Figure 13E:
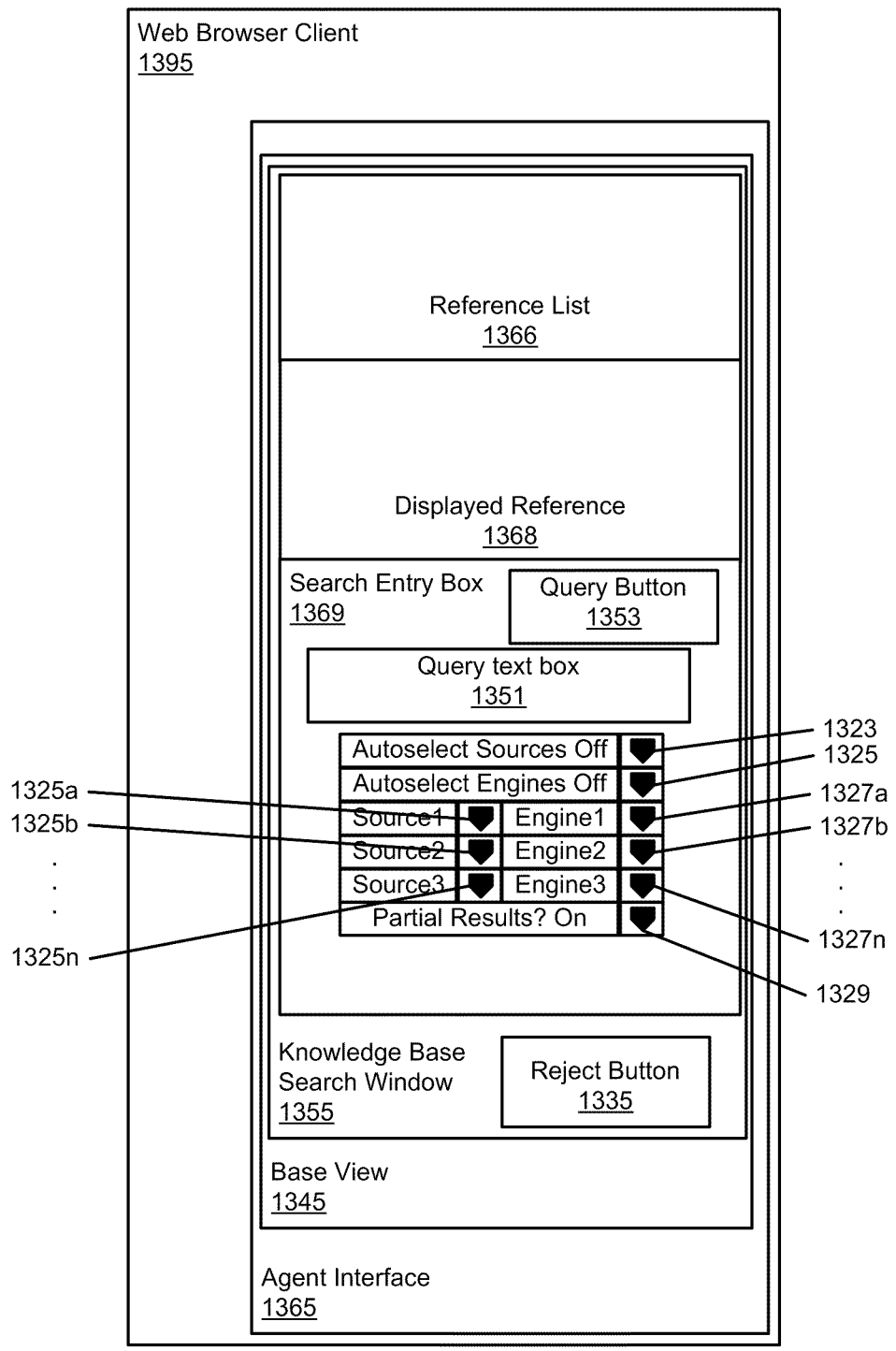
FIG. 13E is a block diagram of a user interface for entering a search request according to an embodiment of the present invention.

FIG. 13E is a block diagram of a user interface for entering a search request according to an embodiment of the present invention. FIG. 13E shows an agent interface 1365 presented for agent use by a web browser client 1395. Agent interface 1365 includes a base view 1345. Base view 1345 includes a knowledge base search window 1355, in which search results are presented and user response to those results is recorded. Knowledge base search window 1355 includes a reference list 1366 and a displayed reference 1368, which are updated based on search results, and responses to which are recorded by agent interface 1365, which is an example of a user interface as discussed above. A search entry box 1369 can be used to request a search through the entry of a search string at a query text box 1351 and actuation of a query button 1353 A reject button 1335 can be used to indicate an unacceptable search result has been opened as displayed reference 1368. Additionally, a source autoselect pulldown 1323 enables a user to determine whether the user or the search architecture selects sources for a search. Similarly, an engine autoselect pulldown 1325 enables a user to determine whether the user or the search architecture selects engines for a search. Specifically, in some embodiments, a user will be able to control the selection of engines for the execution of a search or to allow that selection to be controlled by a search engine. A partial results pulldown 1329 enables a user to control the display of partial results before a search is completed. Source controls 1325a-n enable a user to control which sources are searched, while engine controls 1327a-n allow a user to control which engines search the associated sources. Actuation of the controls displayed in FIG. 13E provides the user with the ability to control the sourcing of search requests through input of various values of desired search source. Clearly, the present embodiments provide for an environment in which a single search request is pointed to a variety of sources, and the use and display of those sources is controlled as described above.

Figure 13F:
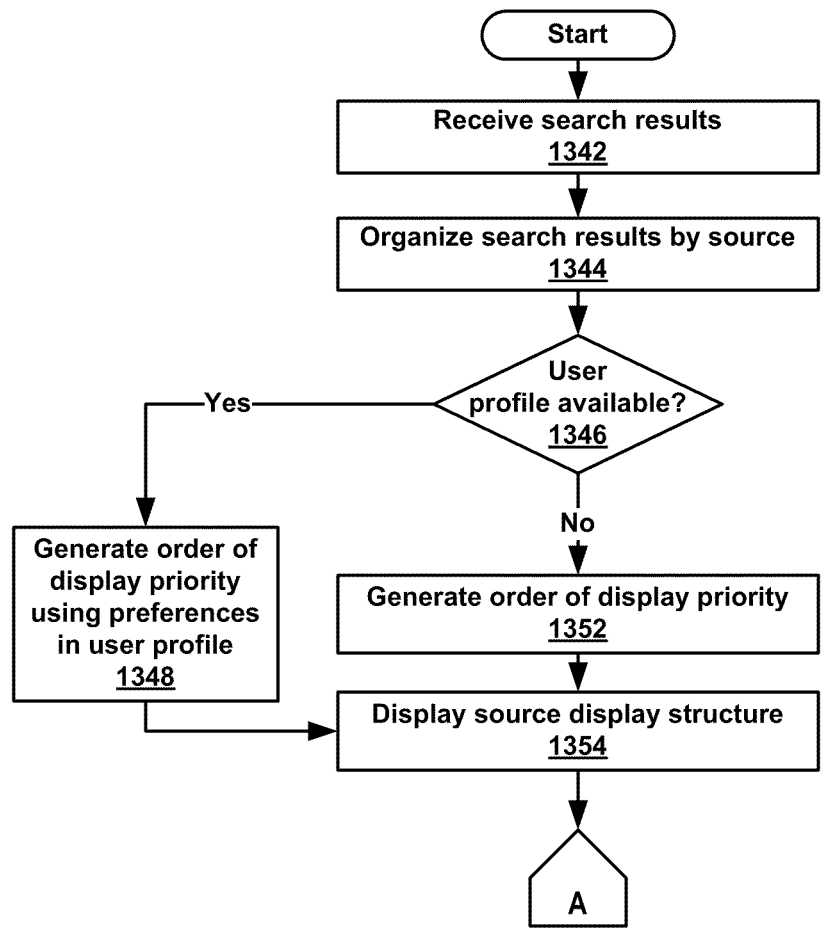
FIG. 13F is a first portion of a flow diagram of a process for handling search results according to an embodiment of the present invention.

FIG. 13F is a first portion of a flow diagram of a process for handling search results according to an embodiment of the present invention. Search results are received (step 1342) from search engines. Search results are then organized by source (step 1344). Source-based organization is performed to support display in a source-centric display tree, such as that described above. A determination is made as to whether a user profile is available for the user requesting the search (step 1346). If no user profile is available for the user requesting the search, then an order of display priority is generated on the basis of user profiles for similar users (step 1352). Embodiments thus provide for display based on the preferences of users similar to the user who requested the search, even if a profile for the specific user is unavailable. If a user profile is available, an order of display priority is created using preferences reflected in the user profile (step 1348). Embodiments employing the user profile allow for a display customized to the needs, preferences, and past history of the user. A source display structure, such as a result tree, containing the results, displayed according to the order of display priority, is then displayed (step 1354).

Figure 13G:
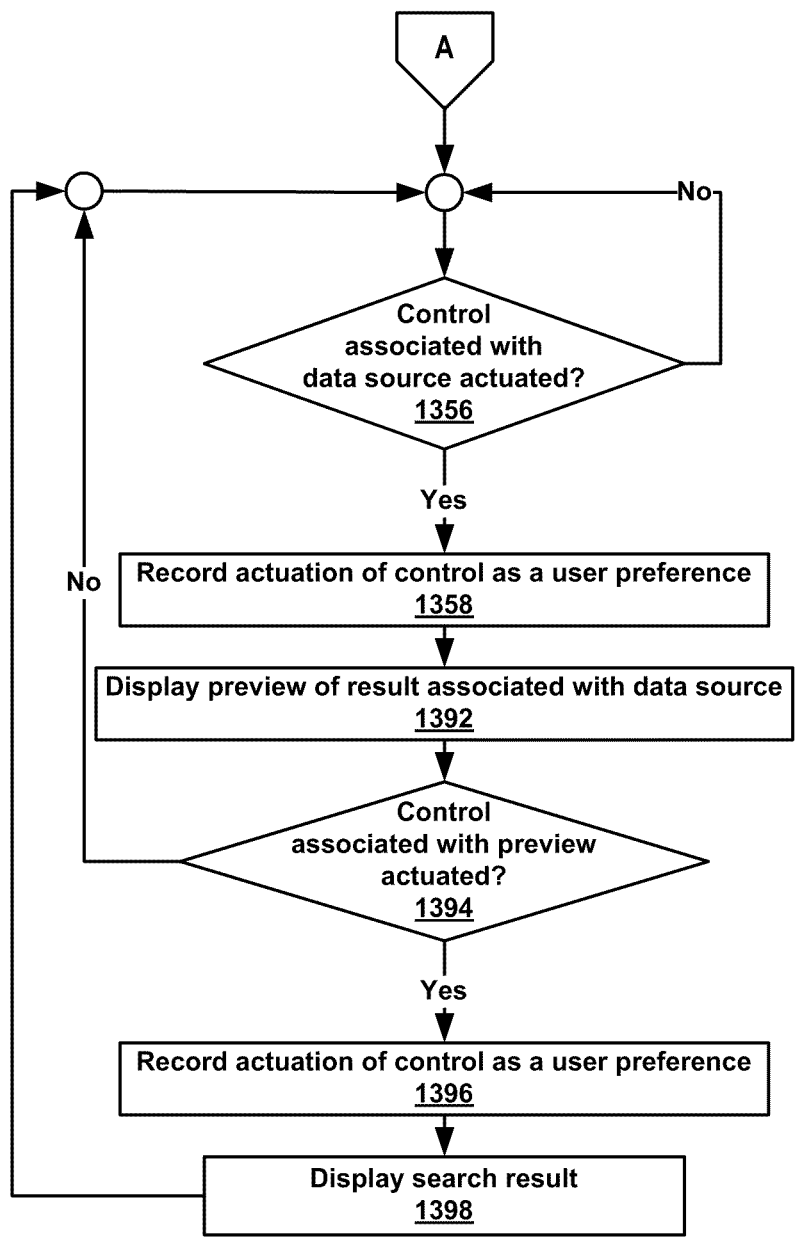
FIG. 13G is a second portion of a flow diagram of a process for handling search results according to an embodiment of the present invention.

FIG. 13G is a second portion of a flow diagram of a process for handling search results according to an embodiment of the present invention. After results are displayed, a determination is made as to whether a control associated with the data source has been actuated (step 1356). If a control is actuated, the actuation of the control is recorded as a user preference (step 1358). This feature allows embodiments to build a user profile that reflects the preferences and needs of the user. A preview of the result associated with the data source associated with the actuated control is then displayed (step 1392). This feature allows selective display of a source in order to present the information desired by a user in a space-efficient manner. After the preview is displayed, a determination is made as to whether a control associated with the preview has been actuated (step 1394). If a control is actuated, the actuation of the control is recorded as a user preference (step 1396). This feature allows embodiments to build a user profile that reflects the preferences and needs of the user. A search result is then displayed (step 1398).

Figure 14:
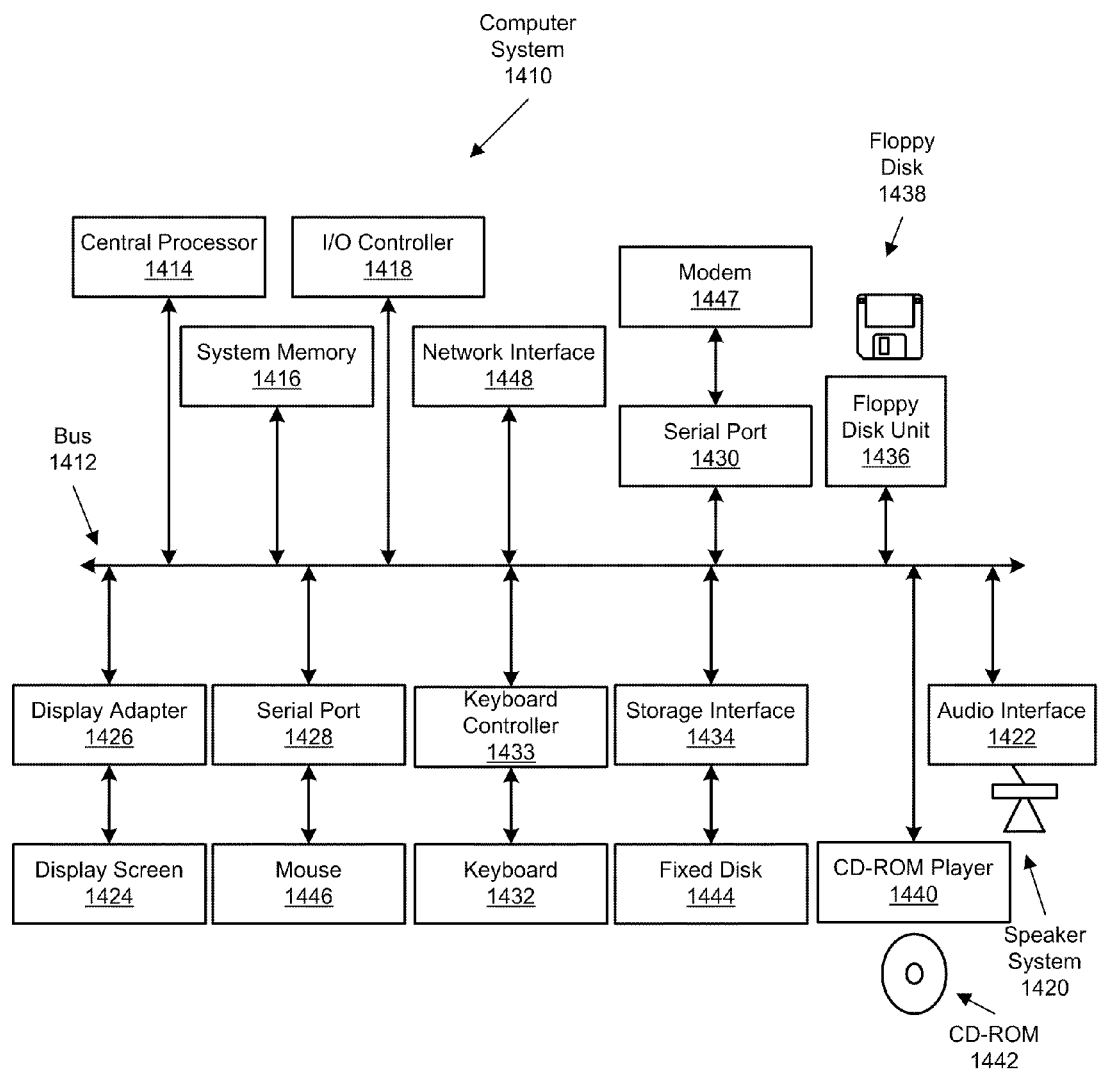
FIG. 14 is a block diagram illustrating the interconnection of the computer system of FIG. 15 to client and host systems.

FIG. 14 depicts a block diagram of a computer system 1410 suitable for implementing the present invention, and example of one or more of client computers 1420(1)-(N). Computer system 1410 includes a bus 1412 which interconnects major subsystems of computer system 1410 such as a central processor 1414, a system memory 1416 (typically RAM, but which may also include ROM, flash RAM, or the like), an input/output controller 1418, an external audio device such as a speaker system 1420 via an audio output interface 1422, an external device such as a display screen 1424 via display adapter 1426, serial ports 1428 and 1430, a keyboard 1432 (interfaced with a keyboard controller 1433), a storage interface 1434, a floppy disk drive 1436 operative to receive a floppy disk 1438, and a CD-ROM drive 1440 operative to receive a CD-ROM 1442. Also included are a mouse 1446 (or other point-and-click device, coupled to bus 1412 via serial port 1428), a modem 1447 (coupled to bus 1412 via serial port 1430) and a network interface 1448 (coupled directly to bus 1412).

Bus 1412 allows data communication between central processor 1414 and system memory 1416, which may include both read only memory (ROM) or flash memory (neither shown), and random access memory (RAM) (not shown), as previously noted. The RAM is generally the main memory into which the operating system and application programs are loaded. The ROM or flash memory may contain, among other code, the Basic Input-Output system (BIOS) which controls basic hardware operation such as the interaction with peripheral components. Applications resident with computer system 1410 are generally stored on and accessed via a computer-readable storage medium, such as a hard disk drive (e.g., fixed disk 1444), an optical drive (e.g., CD-ROM drive 1440), floppy disk unit 1436 or other such storage medium.

Storage interface 1434, as with the other storage interfaces of computer system 1410, may connect to a standard computer-readable storage medium for storage and/or retrieval of information, such as a fixed disk drive 1444. Fixed disk drive 1444 may be a part of computer system 1410 or may be separate and accessed through other interface systems. Many other devices can be connected such as a mouse 1446 connected to bus 1412 via serial port 1428, a modem 1447 connected to bus 1412 via serial port 1430 and a network interface 1448 connected directly to bus 1412. Modem 1447 may provide a direct connection to a remote server via a telephone link or to the Internet via an internet service provider (ISP).

Network interface 1448 may provide a direct connection to a remote server via a direct network link to the Internet via a POP (point of presence). Network interface 1448 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., bar code readers, document scanners, digital cameras and so on). Conversely, it is not necessary for all of the devices shown in FIG. 14 to be present to practice the present invention. The devices and subsystems may be interconnected in different ways from that shown in FIG. 14. The operation of a computer system such as that shown in FIG. 14 is readily known in the art and is not discussed in detail in this application. Code to implement the present invention may be stored in computer-readable storage media such as one or more of system memory 1416, fixed disk 1444, CD-ROM 1442, or floppy disk 1438. Additionally, computer system 1410 may be any kind of computing device, and so includes personal data assistants (PDAs), network appliance, X-window terminal or other such computing device. The operating system provided on computer system 1410 may be MS-DOS®, MS-WINDOWS®, OS/2®, UNIX®, Linux® or other known operating system. Computer system 1410 also supports a number of Internet access tools, including, for example, an HTTP-compliant web browser having a JavaScript interpreter, such as Netscape Navigator®, Microsoft Explorer® and the like.

Figure 15:
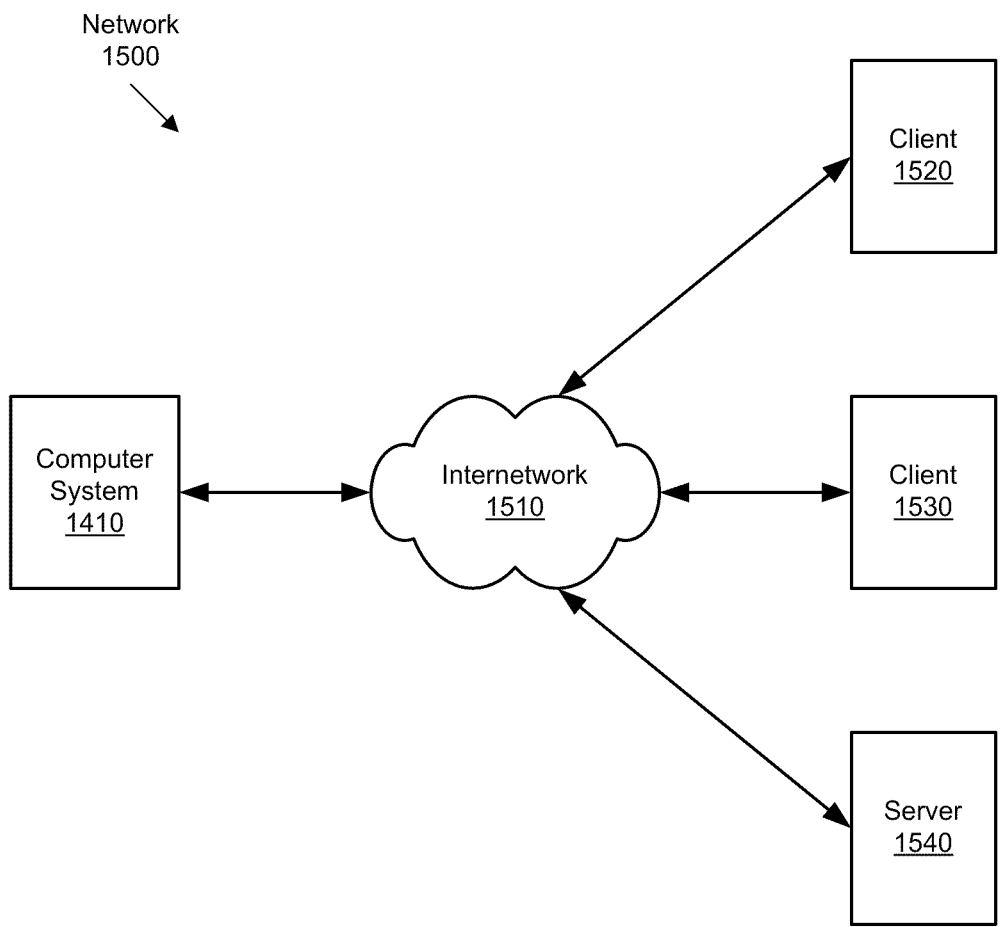
FIG. 15 is a block diagram illustrating a computer system suitable for implementing embodiments of the present invention.

FIG. 15 is a block diagram depicting a network 1500 in which computer system 1410 is coupled to an internetwork 1510, which is coupled, in turn, to client systems 1520 and 1530, as well as a server 1540. Internetwork 1510 (e.g., the Internet) is also capable of coupling client systems 1520 and 1530, and server 1540 to one another. With reference to computer system 1410, modem 1447, network interface 1448 or some other method can be used to provide connectivity from computer system 1410 to internetwork 1510. Computer system 1410, client system 1520 and client system 1530 are able to access information on server 1540 using, for example, a web browser (not shown). Such a web browser allows computer system 1410, as well as client systems 1520 and 1530, to access data on server 1540 representing the pages of a website hosted on server 1540. Protocols for exchanging data via the Internet are well known to those skilled in the art. Although FIG. 15 depicts the use of the Internet for exchanging data, the present invention is not limited to the Internet or any particular network-based environment.

Referring to FIGS. 14 and 15, a browser running on computer system 1410 employs a TCP/IP connection to pass a request to server 1540, which can run an HTTP "service" (e.g., under the WINDOWS® operating system) or a "daemon" (e.g., under the UNIX® operating system), for example. Such a request can be processed, for example, by contacting an HTTP server employing a protocol that can be used to communicate between the HTTP server and the client computer. The HTTP server then responds to the protocol, typically by sending a "web page" formatted as an HTML file. The browser interprets the HTML file and may form a visual representation of the same using local resources (e.g., fonts and colors).

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

As noted, the foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof.

The above description is intended to be illustrative of the invention and should not be taken to be limiting. Other embodiments within the scope of the claimed invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the claimed invention. Consequently, the invention is intended to be limited only by the scope of the appended claims, giving full cognizance to equivalents in all respects.

Although the invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   receiving, a search request at search services module, wherein
      said search request is in a search request format, and
      said search request comprises a query;
   generating a first search query in a search query format, wherein
      said first search query is generated from said search request, and
      said first search query represents, at least in part, said query;
   converting said first search query into first index data, wherein
      said first index data is in a first native format, and
      said first native format is compatible with a first search engine by virtue of said first native format being a first engine-specific format of said first search engine;
   generating a second search query in said search query format, wherein
      said second search query is generated from said search request, and
      said second search query represents, at least in part, said query;
   converting said second search query into second index data, wherein
      said second index data is in a second native format,
      said second native format is compatible with a second search engine by virtue of said second native format being a second engine-specific format of said second search engine, and
      said first native format and said second native format are different from one another;
   sending said first index data to said first search engine, wherein
      said converting said first search query and said sending said first index data are performed by a first search engine adapter;
   sending said second index data to said second search engine, wherein
      said converting said second search query and said sending said second index data are performed by a second search engine adapter; and
   generating a search result, wherein
      said generating said first search query, said generating said second search query, and said generating said search result are performed by said search services module, and
      said generating said search result comprises consolidating
         first result data based, at least in part, on first native result data received from said first search engine, and
         second result data based, at least in part, on second native result data received from said second search engine.

2. The method of claim 1, wherein
   said first native format is compatible with a first naming schema specific to said first search engine,
   said second native format is compatible with a second naming schema specific to said second search engine,
   said search request format is compatible with a generic naming schema, and
   said first naming schema, said second naming schema, and said generic naming schema are different from one another.

3. The method of claim 2, wherein
   said converting said first search query comprises
      performing a first lookup in an engine translation table for said first naming schema, and
      mapping a field of said generic naming schema to an engine-specific field of said first naming schema; and
   said converting said second search query comprises
      performing a second lookup in said engine translation table for said second naming schema, and
      mapping said field of said generic naming schema to an engine-specific field of said second naming schema.

4. The method of claim 3, further comprising:
   receiving a first selection, wherein
      said first selection identifies said first search engine;
   receiving a second selection, wherein
      said second selection identifies said second search engine;
   authenticating said first search engine;
   authenticating said second search engine; and
   maintaining said engine translation table in said search services module.

5. The method of claim 1, wherein
   said first search query is associated with a first communication thread,
   said second search query is associated with a second communication thread, and
   said method further comprises
      opening said first communication thread and said second communication thread, and
      responsive to receiving said first result data and said second result data, closing said first communication thread and said second communication thread.

6. The method of claim 1, wherein
said search request is received from a user interface.

7. The method of claim 5, wherein
said first communication thread and said second communication thread are closed in response to at least one of
a timeout with respect to an expected receipt of one of a set comprising said first result data and said second result data, and/or
receiving one of said set comprising said first result data and said second result data.

8. The method of claim 1, wherein said consolidating comprises:
generating a unified relevance ranking by applying an order of display priority to said first result data and said second result data, wherein
said first result data comprises a plurality of first result data items,
said second result data comprises a plurality of second result data items,
said order of display priority is applied to each of said plurality of first result data items and each of said plurality of second result data items, and
said order of display priority is associated with item relevance scores; and
arranging said each of said plurality of first result data items and said each of said plurality of second result data items in a display according to said unified relevance ranking.

9. The method of claim 8, wherein
said order of display priority is based on a set of user preferences representing one or more previous selections of result data items.

10. The method of claim 9, further comprising:
selecting said first search engine and said second search engine using a first user profile, wherein
said first user profile comprises a first set of user characteristics.

11. The method of claim 10, further comprising:
generating said order of display priority, wherein
said order of display priority is generated based on
said first user profile, and
a second user profile.

12. The method of claim 11, further comprising:
generating said second user profile, wherein
said generating said second user profile comprises
receiving a second set of user characteristics, and
said second set of user characteristics shares a common characteristic with said first set of user characteristics.

13. The method of claim 1, further comprising:
selecting said first search engine and said second search engine based on
a first data source, and
a second data source, wherein
said first search engine is configured to search a first business object via a first search adapter,
said first business object is configured to represent data of said first data source,
said second search engine is configured to search a second business object via a second search adapter, and
said second business object is configured to represent data of said second data source.

14. The method of claim 1, wherein
said query comprises one or more of
one or more keywords,
one or more items, or
one or more Boolean expressions.

15. The method of claim 1, further comprising:
selecting, from a plurality of search engines, said first search engine and said second search engine, wherein
the selecting is based, at least in part, on one or more of
data associated with the search request,
data associated with one or more users, or
data associated with one or more previous search requests.

16. The method of claim 1, further comprising:
determining whether there is a third search engine for which a third search should be generated, wherein
said determining is performed after said generating said first search query and said generating said second search query; and
in response to a determination that there is said third engine for which said third search query should be generated,
generating said third search query in said search query format, and
converting said third search query into third index data, wherein
said third index data is in a third native format,
said third native format is compatible with said third search engine by virtue of said third native format being a third engine-specific format of said third search engine,
said third search query is generated from said search request,
said third search query is based, at least in part, on said query, and
said first native format, said second native format, and said third native format are different from one another.

17. The method of claim 1, further comprising:
receiving said first native result data from said first search engine;
receiving said second native result data from said second search engine;
converting said first native result data into said first result data; and
converting said second native result data into said second result data.

18. The method of claim 1, wherein
said first search query comprises first information,
said second search query comprises second information, and
said first information and said second information differ from one another.

19. The method of claim 1, wherein
said sending said first index data comprises
calling a first search engine application programming interface, and
said sending said second index data comprises
calling a second search engine application programming interface.

20. The method of claim 1, wherein
said generating said first search query comprises
constructing a first set of one or more queries, and
building said first search query from said first set of one or more queries, wherein
said first search query is in a first generic format, and
said generating said second search query comprises
constructing a second set of one or more queries, and
building said second search query from said second set of one or more queries, wherein
said second search query is in a second generic format.

21. A non-transitory computer-readable storage medium comprising a computer program product stored thereon, the computer program product comprising:
   a plurality of instructions comprising
      a first set of instructions, executable on a computer system, configured to receive a search request at search services module, wherein
         said search request is in a search request format, and
         said search request comprises a query;
      a second set of instructions, executable on said computer system, configured to generate a first search query in a search query format, wherein
         said first search query is generated from said search request, and
         said first search query represents, at least in part, said query,
      a third set of instructions, executable on said computer system, configured to convert said first search query into first index data, wherein
         said first index data is in a first native format, and
         said first native format is compatible with a first search engine by virtue of said first native format being a first engine-specific format of said first search engine,
      a fourth set of instructions, executable on said computer system, configured to generate a second search query in said search query format, wherein
         said second search query is generated from said search request, and
         said second search query represents, at least in part, said query,
      a fifth set of instructions, executable on said computer system, configured to convert said second search query into second index data, wherein
         said second index data is in a second native format,
         said second native format is compatible with a second search engine by virtue of said second native format being a second engine-specific format of said second search engine, and
         said first native format and said second native format are different from one another,
      a sixth set of instructions, executable on said computer system, configured to send said first index data to said first search engine, wherein
         said third and said sixth sets of instructions are comprised in a first search engine adapter,
      a seventh set of instructions, executable on said computer system, configured to send said second index data to said second search engine, wherein
         said fifth and said seventh sets of instructions are comprised in a second search engine adapter, and
      an eighth set of instructions, executable on said computer system, configured to generate a search result, wherein
         said first, said second, said fourth, and said eighth sets of instructions are comprised in said search services module, and
         said eighth set of instructions comprises
            a first subset of instructions, executable on said computer system, configured to consolidate
               first result data based, at least in part, on first native result data received from said first search engine, and
               second result data based, at least in part, on second native result data received from said second search engine.

22. The non-transitory computer-readable storage medium of claim 21, wherein
   said first native format is compatible with a first naming schema specific to said first search engine,
   said second native format is compatible with a second naming schema specific to said second search engine,
   said search request format is compatible with a generic naming schema, and
   said first naming schema, said second naming schema, and said generic naming schema are different from one another.

23. The non-transitory computer-readable storage medium of claim 22, wherein
   said third set of instructions is further configured to
      perform a first lookup in an engine translation table for said first naming schema, and
      map a field of said generic naming schema to an engine-specific field of said first naming schema; and
   said fifth set of instructions is further configured to
      perform a second lookup in said engine translation table for said second naming schema, and
      map said field of said generic naming schema to an engine-specific field of said second naming schema.

24. The non-transitory computer-readable storage medium of claim 23, wherein said plurality of instructions further comprises:
   a ninth set of instructions, executable on said computer system, configured to receive a first selection, wherein said first selection identifies said first search engine;
   an tenth set of instructions, executable on said computer system, configured to receive a second selection, wherein
      said second selection identifies said second search engine;
   a eleventh set of instructions, executable on said computer system, configured to authenticate said first search engine;
   a twelfth set of instructions, executable on said computer system, configured to authenticate said second search engine; and
   a thirteenth set of instructions, executable on said computer system, configured to maintain said engine translation table in said search services module.

25. The non-transitory computer-readable storage medium of claim 21, said plurality of instructions further comprising:
   a ninth set of instructions, executable on said computer system, configured to receive said first native result data from said first search engine and said second native result data from said second search engine, wherein
      said first search query is associated with a first communication thread,
      said second search query is associated with a second communication thread, and
      said plurality of instructions further comprises a sixth set of instructions, executable on said computer system, configured to
         open said first communication thread and said second communication thread, and
         responsive to receipt of said first result data and said second result data, close said first communication thread and said second communication thread.

26. The non-transitory computer-readable storage medium of claim 21, wherein
   said first set of instructions is further configured to
      receive said search request from a user interface, and
      transmit said search result to said user interface.

27. An apparatus, comprising:
a search services module configured to
  receive a search request, wherein
    said search request is in a search request format, and
    said search request comprises a query,
  generate a first search query in a search query format, wherein
    said first search query is generated from said search request, and
    said first search query represents, at least in part, said query, and
  generate a second search query in said search query format, wherein
    said second search query is generated from said search request, and
    said second search query represents, at least in part, said query;
a first search engine adapter configured to
  convert said first search query into first index data, wherein
    said first index data is in a first native format, and
    said first native format is compatible with a first search engine by virtue of said first native format being a first engine-specific format of said first search engine, and
  send said first index data to said first search engine; and
a second search engine adapter, wherein
  said second search engine adapter is configured to
    convert said second search query into second index data, wherein
      said second index data is in a second native format,
      said second native format is compatible with a second search engine by virtue of said second native format being a second engine-specific format of said second search engine, and
      said first native format and said second native format are different from one another, and
    send said second index data to said second search engine, and
  said search services module is further configured to
    generate a search result by consolidating
      first result data based, at least in part, on first native result data received from said first search engine, and
      second result data based, at least in part, on second native result data received from said second search engine.

28. The apparatus of claim 27, wherein
said first native format is compatible with a first naming schema specific to said first search engine,
said second native format is compatible with a second naming schema specific to said second search engine,
said search request format is compatible with a generic naming schema, and
said first naming schema, said second naming schema, and said generic naming schema are different from one another.

29. The apparatus of claim 28, wherein
said first search engine adapter is further configured to
  perform a first lookup in an engine translation table for said first naming schema, and
  map a field of said generic naming schema to an engine-specific field of said first naming schema;
said second search engine adapter is further configured to
  perform a second lookup in said engine translation table for said second naming schema, and
  map said field of said generic naming schema to an engine-specific field of said second naming schema, wherein
    said engine translation table is maintained by said search services module;
said first search engine adapter is further configured to
  perform an authentication of said first search engine; and
said second search engine adapter is further configured to
  perform an authentication of said second search engine.

30. The apparatus of claim 29, wherein
said search services module is further configured to
  select said first search engine and said second search engine,
said first search engine is configured to search a first business object via a first search adapter,
said first business object is configured to represent data of a first data source,
said second search engine is configured to search a second business object via a second search adapter, and
said second business object is configured to represent data of a second data source.

31. The apparatus of claim 27, wherein
said first search engine adapter is further configured to
  receive said first native result data from said first search engine,
said second search engine adapter is further configured to
  receive said second native result data from said second search engine,
said first search query is associated with a first communication thread,
said second search query is associated with a second communication thread, and
said search services module is further configured to
  open said first communication thread and said second communication thread, and
  responsive to receiving said first result data and said second result data, close said first communication thread and said second communication thread.

32. The apparatus of claim 31, wherein
said first communication thread and said second communication thread are closed in response to at least one of
  a timeout with respect to an expected receipt of one of a set comprising
    said first result data and said second result data, and/or
  receiving one of said set comprising said first result data and said second result data.

33. The apparatus of claim 27, wherein
said search services module is further configured to
  receive said search request from a user interface, and
  transmit said search result to said user interface.

34. The apparatus of claim 27, wherein
said first search engine adapter is configured to convert said first search query into said
  first index data by virtue of comprising
    a first generic search adapter, and
    a first engine specific adapter, coupled to said first generic search adapter, and
said second search engine adapter is configured to convert said first search query into
  said second index data by virtue of comprising
    a second generic search adapter, and
    a second engine specific adapter, coupled to said second generic search adapter.

* * * * *

UNITED STATES PATENT AND TRADEMARK OFFICE
CERTIFICATE OF CORRECTION

| | | |
|---|---|---|
| PATENT NO. | : 9,009,135 B2 | Page 1 of 1 |
| APPLICATION NO. | : 12/696528 | |
| DATED | : April 14, 2015 | |
| INVENTOR(S) | : Gutlapalli et al. | |

It is certified that error appears in the above-identified patent and that said Letters Patent is hereby corrected as shown below:

In the claims

In column 34, line 11, Claim 16, delete "search should" and insert -- search query should --, therefor.

Signed and Sealed this
Sixteenth Day of February, 2016

Michelle K. Lee
*Director of the United States Patent and Trademark Office*